United States Patent
Moir et al.

(10) Patent No.: US 8,176,264 B2
(45) Date of Patent: *May 8, 2012

(54) SOFTWARE TRANSACTIONAL MEMORY FOR DYNAMICALLY SIZABLE SHARED DATA STRUCTURES

(75) Inventors: Mark S. Moir, Somerville, MA (US); Victor M. Luchangco, Arlington, MA (US); Maurice Herlihy, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,992

(22) Filed: Feb. 18, 2011

(65) Prior Publication Data

US 2011/0138134 A1 Jun. 9, 2011

Related U.S. Application Data

(62) Division of application No. 11/961,097, filed on Dec. 20, 2007, now Pat. No. 7,895,401, which is a division of application No. 10/621,072, filed on Jul. 16, 2003, now Pat. No. 7,328,316.

(60) Provisional application No. 60/396,152, filed on Jul. 16, 2002.

(51) Int. Cl.
*G06F 12/00* (2006.01)

(52) U.S. Cl. ........ 711/147; 711/100; 711/150; 711/152; 711/154

(58) Field of Classification Search .............. 711/100, 711/141, 147, 150, 152, 154, E12.001
See application file for complete search history.

(56) References Cited

U.S. PATENT DOCUMENTS

| | | | |
|---|---|---|---|
| 4,584,640 A | 4/1986 | MacGregor et al. | |
| 4,847,754 A | 7/1989 | Obermarck et al. | |
| 5,224,215 A | 6/1993 | Disbrow | |
| 5,428,761 A | 6/1995 | Herlihy et al. | |
| 6,128,710 A | 10/2000 | Greenspan et al. | |
| 6,144,965 A | 11/2000 | Oliver | |
| 6,173,375 B1 * | 1/2001 | Arshad | 711/152 |
| 6,178,423 B1 | 1/2001 | Douceur et al. | |
| 6,360,219 B1 | 3/2002 | Bretl et al. | |

(Continued)

FOREIGN PATENT DOCUMENTS

EP 0 366 585 5/1990

(Continued)

OTHER PUBLICATIONS

Michael, et al., "Non-blocking Algorithms and Preemption-Safe Locking on Multiprogrammed Shared Memory Multiprocessors," Journal of Parallel and Distributed Computing, Mar. 1997.

(Continued)

*Primary Examiner* — Jasmine Song
(74) *Attorney, Agent, or Firm* — Robert C. Kowert; Meyertons, Hood, Kivlin, Kowert & Goetzel, P.C.

(57) ABSTRACT

We propose a new form of software transactional memory (STM) designed to support dynamic-sized data structures, and we describe a novel non-blocking implementation. The non-blocking property we consider is obstruction-freedom. Obstruction-freedom is weaker than lock-freedom; as a result, it admits substantially simpler and more efficient implementations. An interesting feature of our obstruction-free STM implementation is its ability to use of modular contention managers to ensure progress in practice.

20 Claims, 2 Drawing Sheets

U.S. PATENT DOCUMENTS

| | | |
|---|---|---|
| 6,360,220 B1 | 3/2002 | Forin |
| 6,366,932 B1 | 4/2002 | Christenson |
| 6,581,063 B1 | 6/2003 | Kirkman |
| 6,651,146 B1 | 11/2003 | Srinivas et al. |
| 6,697,927 B2 | 2/2004 | Bonola |
| 6,700,513 B2 | 3/2004 | McGuire |
| 6,826,757 B2 | 11/2004 | Steele, Jr. et al. |
| 7,076,629 B2 * | 7/2006 | Bonola .................. 711/170 |
| 2001/0047361 A1 | 11/2001 | Martin et al. |
| 2002/0069326 A1 | 6/2002 | Richardson et al. |
| 2003/0065892 A1 | 4/2003 | Bonola |
| 2003/0105943 A1 | 6/2003 | Yeh et al. |
| 2003/0140085 A1 | 7/2003 | Moir et al. |
| 2003/0174572 A1 | 9/2003 | Moir et al. |
| 2003/0182462 A1 | 9/2003 | Moir et al. |
| 2003/0182465 A1 | 9/2003 | Moir et al. |
| 2004/0015510 A1 | 1/2004 | Moir et al. |
| 2004/0034673 A1 | 2/2004 | Moir et al. |
| 2004/0153687 A1 | 8/2004 | Moir et al. |

FOREIGN PATENT DOCUMENTS

| | | |
|---|---|---|
| EP | 0 466 339 | 1/1992 |
| WO | 86/00434 | 1/1986 |
| WO | 01/53942 | 7/2001 |
| WO | 01/53943 | 7/2001 |
| WO | 01/80015 | 10/2001 |
| WO | 01/82057 | 11/2001 |
| WO | 03/060705 | 7/2003 |
| WO | 03/060715 | 7/2003 |

OTHER PUBLICATIONS

Saks, Michael, et al., "Optimal Time Randomized Consensus—Making Resilient Algorithms Fast in Practice," 2nd ACM SIAM Symposium on Discrete Algorithms, pp. 351-362, 1991.

Herlihy, M.P., et al., "Linearizability: A Correctness Condition for Con-Current Objects," ACM Transactions on Programming Languages and Systems, 12(3):463-492, Jul. 1990.

Herlihy, M.P., "Wait-Free Synchronization," ACM Transactions on Programming Languages and Systems, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:http://www.cs.columbia.edu/reportsIreports-I992/cucs-039-92.ps. gz].

Bershad, B. N., "Practical Considerations for Non-Blocking Concurrent Objects," Proceedings 13th IEEE International Conference on Distributed Computing Systems, pp. 264-273. IEEE Computer Society Press, Washington, D.C., 1993.

Herlihy, M., "A Methodology for Implementing Highly Concurrent Data Objects," ACM Transactions on Programming Languages and Systems, 15(5):745-770, Nov. 1993.

Attiya, Hagit, et al., "Are Wait-Free Algorithms Fast?" Journal of the ACM, 41(4):725-763, Jul. 1994.

Lamarca, A., "A performance evaluation of lock-free synchronization protocols," Proceedings of the 13th Annual ACM Symposium on Principles of Distributed Computing, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," Proceedings of the 15th Annual ACM Symposium on Principles of Distributed Computing, pp. 223-232, ACM Press, New York, NY, 1996.

Greenwald, M. B., et al., "The Synergy Between Non-Blocking Synchronization and Operating System Structure," Proceedings of the 2nd Symposium on Operating Systems Design and Implementation, pp. 123-136, Usenix Association, Berkeley, CA, 1996.

Afek, Y., et al., "Disentangling Multi-Object Operations," Proceedings of the 16th Annual ACM Symposium on Principles of Distributed Computing, pp. 111-120, Aug. 1997. Santa Barbara, CA.

Arora, N. S., et al., "Thread Scheduling for Multiprogrammed Multiprocessors," Proceedings of the 10th Annual ACM Symposium on Parallel Algorithms and Architectures, pp. 119-129, ACM Press, New York, NY, 1998.

Attiya, Hagit, et al., "Atomic Snapshots in O(n log n) Operations," SIAM Journal on Computing, 27(2):319-340, Apr. 1998.

Greenwald, M., "Non-Blocking Synchronization and System Design," PhD thesis, Stanford University Technical Report STAN-CS-TR-99/1624, Palo Alto, CA, Aug. 1999,241 pages.

Detlefs, David L., et al., "Even Better DCAS-Based Concurrent Deques," Lecture Notes in Computer Science, vol. 1914, pp. 59-73, Springer-Verlag, Berlin, Germany, ISBN: 3-540-41143-7,2000.

Afek, Yehuda, "Atomic Snapshots of Shared Memory," Journal of the ACM, vol. 40, No. 4, pp. 873-890, 1993.

Afek, Yehuda et al., "Long-Lived Renaming Made Adaptive," Proceedings of the 18th Annual ACM Symposium on Principles of Distributed Computing, pp. 91-103, ACM Press, New York, NY, 1999.

Agesen, Ole at el., "An Efficient Meta-Lock for Implementing Ubiquitous Synchronization," ACM SIGPLAN Notices, vol. 34, No. 10, pp. 207-222, Oct. 1999.

Agesen, Ole, et al.: "DCAS-Based Concurrent Deques," Theory of Computing Systems, vol. 35, No. 3, pp. 349-386, May 2002.

Anderson, James H. et al., "Universal Constructions for Large Objects," IEEE Transactions on Parallel and Distributed Systems, vol. 10, No. 12, pp. 1317-1332, 1999.

Attiya, Hagit et al., "An Adaptive Collect Algorithm with Applications," Distributed Computing, vol. 15, No. 2, pp. 87-96, Apr. 2002.

Barnes, G., "A Method for Implementing Lock-Free Shared Data Structures," Proceedings of the 5th ACM Symposium on Parallel Algorithms and Architectures, pp. 261-270, ACM Press, New York, NY 1993.

Detlefs, David L. et al., "Lock-Free Reference Counting," Proc. 20th Annual ACM Symposium on Principles of Distributed Computing, pp. 190-199, ACM Press, New York, NY, 2001.

Herlihy, M., et al., "Transactional Memory: Architectural Support for Lock-Free Data Structures," Proc. 20th International Symposium in Computer Architecture, pp. 289-300, IEEE Computer Society, Washington, D.C., 1993.

Herlihy, Maurice, "Dynamic-Sized Lockfree Data Structures," Sun Microsystems Technical Report SMLI TR-2002-112, Jun. 2002.

Herlihy, Maurice, et al., "The Repeat Offender Problem: A Mechanism for Supporting Dynamic-Sized Lock-Free Data Structures," Free Data Structures, Sun Microsystems Technical Report SMLI TR-2002-112, Jun. 2002.

Herlihy, Maurice et al., "Obstruction-Free Synchronization: Double-Ended Queues as an Example," Proceedings of the 23rd International Conference on Distributed Computing, p. 522, IEEE Computer Society, Washington, D.C., 2003.

Israeli, Amos et al., "Disjoint-Access-Parallel Implementations of Strong Shared Memory Primitives," Proc. ' 13th Annual ACM Symposium on Principles of Distributed Computing, pp. 151-160, ACM Press, New York, NY, 1994.

Lamport, Leslie, "A Fast Mutual Exclusion Algorithm," ACM Transactions on Computer Systems, vol. 5, No. 1, pp. 1-11, 1987.

Luchangco, Victor et al., "Nonblocking k-compare-single-swap," Proceedings of the 15th Annual ACM Symposium on Parallel Algorithms and Architectures, pp. 314-323, ACM Press, New York, NY, 2003.

Moir, Mark et al., "Wait-Free Algorithms for Fast, Long-Lived Renaming," Science of Computer Programming, vol. 25, No. 1, pp. 1-39, Aug. 1995.

Moir, Mark, "Practical implementation of non-blocking synchronization primitives," Proceedings of the Sixteenth Annual ACM Symposium on Principles of Distributed Computing, pp. 219-228, ACM Press, New York, NY, 1997.

Moir, Mark, Transparent Support for Wait-Free Transactions, Proceedings of the 17th International Workshop on Distributed Algorithms, pp. 305-319, Springer-Verlag, London, UK, 1997.

Moir, Mark, "Laziness Pays! Using Lazy Synchronization Mechanisms to Improve Non-Blocking Constructions," Proc. 19th Annual ACM Symposium on Principles of Distributed Computing, pp. 61-70, ACM Press, New York, NY, 2000.

Shavit, N., et al., "Software Transactional Memory," Distributed Computing, vol. 10, No. 2, pp. 99-116, February Computing, vol. 60, No. 11, pp. 1355-1387, Nov. 2000.

Treiber, R., "Systems Programming: Coping with Parallelism," IBM Technical Report RJ5118, Apr. 23, 1986.

Turek, John et al., "Locking Without Blocking: Making Lock Based Concurrent Data Structure Algorithms Nonblocking," Proceedings of the Eleventh ACM SIGACT-SIGMOD-SIGART Symposium on Principles of Database Systems, pp. 212-222, ACM Press, New York, NY, 1992.

Mellor-Crummey, J., et al., Algorithms for Scalable Synchronization on Shared-Memory Multiprocessors, ACM Transactions on Computer Systems, vol. 9, No. 1, pp. 21-65, Feb. 1991.

Prakash, Sundeep et al., "Non-Blocking Algorithms for Concurrent Data Structures," Technical Report 91-002, University of Florida, Jul. 1, 1991 [URL: http://citeseer.ist.psu.edu/prakash91nonblocking.html].

Prakash, Sundeep et al., "A Nonblocking Algorithm for Shared Queues Using Compare-and-Swap," IEEE Transactions on Computers, vol. 43, No. 5, pp. 548-559, May 1994.

Shann, Chien-Hua et al., "A Practical Nonblocking Queue Algorithm Using Compare-and Swap," Proceedings of the Seventh International Conference on Parallel and Distributed Systems p. 470, IEEE Computer Society, Washington, D.C., 2000.

Shavit, N., et al., "Elimination Trees and the Construction of Pools and Stacks," Theory of Computing Systems, vol. 30, pp. 645-670, 1997.

Stone, Janice M., "A simple and correct shared-queue algorithm using Compare-and-Swap," Proceedings of the 1990 ACM/IEEE Conference on Supercomputing, pp. 495-504, IEEE Computer Society, New York, NY, 1990.

Valois, John D., "Lock-Free Linked Lists Using Compare-and-Swap," Proceedings of the Fourteenth ACM Symposium on Principles of Distributed Computing, pp. 214-222, ACM Press, New York, NY 1995.

Afek, Yehuda et al., "Wait-Free Made Fast", 27th Annual ACM Symposium on Theory of Computing, pp. 538-547, 1995.

Anderson, James H. et al., "Using Local-Spin k-Exclusion Algorithms to Improve Wait-Free Object Implementations", 12th Annual ACM Symposium on Principles of Distributed Computing, Nov. 1995 (revised 1996, 1997).

Dice, David et al., "Mostly Lock-Free Malloc", ACM 2002.ACM SIGPLAN International Symposium on Memory Management, Jun. 2002.

Lamport, Leslie, "How to Make a Multiprocessor Computer that Correctly Executes Multiprocess Programs", IEEE Transactions on Computers, Sep. 1979.

Martin, Paul et al., "DCAS-Based Concurrent Deques Supporting Bulk Allocation", Sun Microsystems, Inc. Technical Report SMI TR-2002-111, Oct. 2002.

* cited by examiner

SOFTWARE TRANSACTIONAL MEMORY FOR DYNAMICALLY SIZABLE SHARED DATA STRUCTURES

CROSS-REFERENCE TO RELATED APPLICATION(S)

This application is a divisional of U.S. application Ser. No. 11/961,097, filed Dec. 20, 2007 now U.S. Pat. No. 7,895,401, which is a divisional of U.S. application Ser. No. 10/621,072, filed Jul. 16, 2003 now U.S. Pat. No. 7,328,316, which claims priority, under 35 U.S.C. §119(e) to U.S. Provisional Application No. 60/396,152, filed 16 Jul. 2002, naming Mark Moir, Victor Luchangco and Maurice Herlihy as inventors.

BACKGROUND

1. Field of the Invention

The present invention relates generally to coordination amongst execution sequences in a multiprocessor computer, and more particularly, to structures techniques for facilitating non blocking implementations of shared data structures.

2. Description of the Related Art

Significant research effort has been applied in recent years to the development nonblocking implementations of shared data structures. Typically, this work is aimed at avoiding the numerous problems associated with the use of mutually exclusive locks when accessing shared data structures. These problems include deadlock, convoying and priority inversion and are generally well known in the art.

By using locks, operations on a shared data structure can prevent concurrent operations from accessing (parts of) the data structure for certain periods of time. In contrast, an operation in a nonblocking implementation of a shared data structure can be interrupted at any moment by another operation, and therefore the implementation must typically keep data consistent in every state, rather than simply ensuring that the data are consistent before releasing a lock. This presents a challenge, because if we want to change multiple parts of the data structure then we must prevent another operation from "seeing" some parts of the updates but not others.

Because current hardware architectures do not typically support an atomic modification of multiple, non-contiguous memory locations, it would be desirable to provide the illusion of this atomicity in software. Unfortunately, achieving this goal has proven difficult, particularly when we consider that nonoverlapping sets of atomic updates should not interfere with each other's performance if there is to be any hope of scalability of applications and data structure implementations that would employ the atomic updates. There has been a considerable amount of research directed toward providing abstractions to relieve designers of the burden of the difficult reasoning that is needed in these cases.

One approach, originally proposed by Herlihy, envisions universal constructions that automatically produce nonblocking implementations of shared data structures given only sequential code for their operations. See M. Herlihy, *A Methodology for Implementing Highly Concurrent Data Objects*, *ACM Transactions on Programming Languages and Systems*, 15(5):745-770 (1993). This approach is attractive because it completely relieves designers of the burden of reasoning about concurrency. Unfortunately, Herlihy's original constructions are expensive in time and in space, and do not exploit parallelism between concurrent operations even if they do not access overlapping parts of the data structure. However, there has been a fair amount of work since on universal constructions, which addresses some or all of those problems. See e.g., J. Anderson and M. Moir, *Universal Constructions for Large Objects*, IEEE Transactions on Parallel and Distributed Systems, 10(12):1317-1332 (1999); M. Moir, *Transparent Support for Wait-free Transactions*, In Proceedings of the 11th International Workshop on Distributed Algorithms, pp. 305-319 (1997); M. Moir, *Laziness pays! Using Lazy Synchronization Mechanisms to Improve Non-Blocking Constructions*, In Proceedings of the 19th Annual ACM Symposium on the Principles of Distributed Computing, pp. 61-70 (2000). Unfortunately, despite significant progress, these approaches are still not widely used in practice, partly because the generality of the approaches tends to preclude optimizations that are based on knowledge of the semantics of a particular data structure being implemented.

Another approach that does not present this same set of practical limitations is to provide programmers with stronger support for implementing nonblocking shared data structures, without attempting to completely relieve them of the burden of reasoning about concurrency. Such approaches can significantly ease the task of designing and reasoning such data structures, while still leaving room for optimizations based on semantics of the data structure being implemented. An important feature of such mechanisms is support for the illusion that we can read and modify multiple memory locations atomically, as this substantially simplifies reasoning about invariants on the data.

Several interfaces can be considered for providing such an illusion; in general the key synchronization mechanisms used to support these interfaces are not very different, but ease of use for programmers and efficiency of implementations can differ greatly. One class of such interfaces is transactional memory, in which programmers can designate certain sequences of operations as "transactions," which are guaranteed by the transactional memory implementation to either take effect atomically and in their entirety (in which case we say they succeed), or have no externally visible effect (in which case we say that they fail). Several variations on the programmer interface to transactional memory have been considered in the past, and both hardware and software solutions have been proposed. See e.g., M. Herlihy and J. Moss, *Transactional Memory: Architectural Support for Lock-Free Data Structures*, In Proceedings of the 20th International Symposium in Computer Architecture, pp. 289-300 (1993); N. Shavit and D. Touitou, *Software Transactional Memory*, Distributed Computing, Special Issue (10):99-116 (1997).

Unfortunately, prior designs for software transactional memory have required that both memory usage and the set of transactions that access transactional memory be defined statically in advance. Techniques are desired whereby these and other restrictions can be relaxed.

SUMMARY

We present an implementation of software transactional memory that allows concurrent non-blocking access to a dynamically sizable data structure defined in shared storage managed by the software transactional memory. We call the implementation dynamic software transactional memory (DSTM). Our DSTM techniques allow transactions and transactional objects to be created dynamically. In addition, in some exploitations of our techniques, transactions may determine the sequence of objects to access based on the values observed in objects accessed earlier in the same transaction. As a result, DSTM is well suited to the implementation of dynamic-sized data structures such as lists and trees.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Terminology

Figure 1:
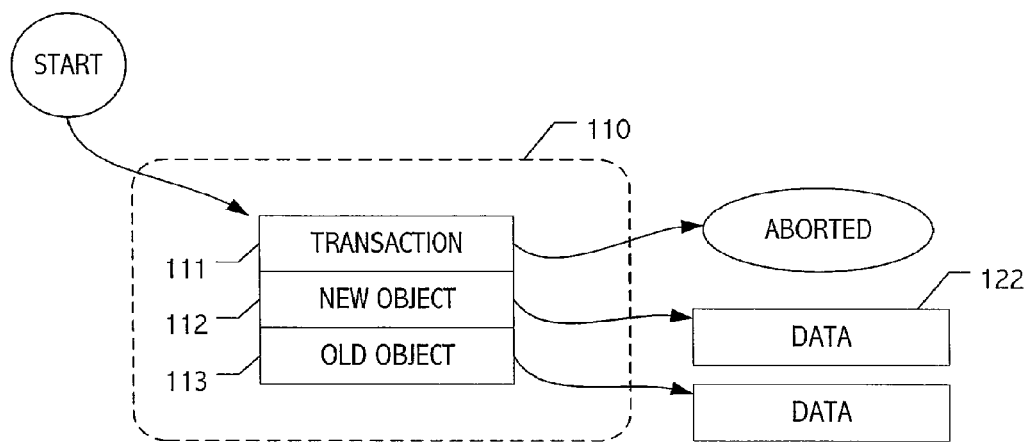
FIG. 1 depicts a locator structure used in accordance with some embodiments and operations of the present invention.

A shared data structure is a collection of data that can be accessed using an associated set of operations. The traditional way to implement a shared data structure is to use mutual exclusion (locks) to ensure that multiple operations do not concurrently access (the same part of) the data structure concurrently. This approach has many disadvantages, as discussed in numerous papers in the literature. A significant amount of research over the last decade or so has focused on designing nonblocking shared data structures, which preclude the use of locks and thereby avoid their associated disadvantages.

Thus far, two nonblocking conditions, lock-freedom and wait-freedom, have been considered in the literature. In this description, we focus on a new nonblocking condition, obstruction-freedom, that we now define, in part, through contrast with the more conventionally understood nonblocking conditions.

Lock-freedom: An implementation of an operation is lock-free if after a finite number of steps of any execution of that operation, some operation execution completes (irrespective of the timing behavior of any concurrent operation executions).

Wait-freedom: An implementation of an operation is wait-free if after a finite number of steps of any execution of that operation, that operation execution completes (irrespective of the timing behavior of any concurrent operation executions).

A shared data structure is lock-free or wait-free if all its operations are lock-free or wait-free respectively. Much of the difficulty associated with designing lock-free and wait-free shared data structures is that when concurrent operations interfere with each other, we must ensure that at least one of them makes progress (all of them, in the wait-free case). Obstruction-freedom relaxes this requirement. We explain in the next section why obstruction-freedom is a useful property despite its weaker progress guarantees.

Obstruction-freedom: An implementation of an operation is obstruction-free if every operation execution that executes in isolation after some point completes after a finite number of steps.

Observe that all three properties preclude the use of locks for synchronization because, if an operation acquires a lock and then fails, any other operation that requires that lock can never complete, regardless of how many steps it takes, even if it runs alone.

As applied to transactional memory, the definitions above need to be extended slightly to preclude the possibility that every attempt to commit any transaction fails. In particular, in addition to requiring that every transactional memory operation has a particular nonblocking property, we must also require that progress guarantees appropriate to that property are made at the transaction level. Specifically, we have the following nonblocking definitions for transactional memory.

Wait-free transactional memory: A transactional memory implementation is wait-free if all its operations are wait-free and any thread that repeatedly attempts to commit transactions eventually performs a successful commit.

Lock-free transactional memory: A transactional memory implementation is lock-free if all its operations are lock-free and if some thread repeatedly attempts to commit transactions, then eventually some thread performs a successful commit.

Obstruction free transactional memory: A transactional memory implementation is obstruction-free if all its operations are obstruction-free and if some thread repeatedly attempts to commit transactions, and runs in isolation after some point, then it eventually performs a successful commit.

An Argument for Obstruction-Free Implementations

Clearly, obstruction-freedom is a weaker property than lock-freedom and wait-freedom. Here, we explain why we believe that it is nonetheless an important property to consider.

First, we believe that obstruction-free implementations are likely to be substantially simpler to design than lock-free and especially wait-free ones. This has numerous benefits including ease of modification, ease of verification, etc. In this specification, we describe the first nonblocking implementation of dynamic software transactional memory (STM); our implementation guarantees obstruction-freedom but not lock-freedom. It is simpler and more efficient than lock-free implementations of static STM.

Second, in some scenarios, we can exploit properties of the environment to ensure that every obstruction-free operation execution completes. For example, in a uniprocessor where threads are scheduled by time slice, relatively short obstruction-free operations may be guaranteed to run alone for long enough to complete. Another example is in priority-scheduled uniprocessors: an operation runs in isolation unless it is preempted by a higher priority operation.

Third, in some scenarios, we might reason that, even though the system does not guarantee operations will run in isolation for long enough to complete, we may determine by analysis or experiments that the "livelock" scenario that lock-freedom precludes but obstruction-freedom admits does not occur in practice.

Finally, an obstruction-free implementation can be augmented with a variety of different mechanisms that attempt to control the interactions between concurrent operations in order to ensure that operations eventually complete. A simple example is to use "backoff." Using this approach, operations wait before retrying upon encountering interference. Various schemes can be chosen for deciding how long to wait. One choice is a combination of randomization and exponential back off, which is very likely to cause operations to run long enough in isolation to complete. Such schemes can be effective for improving the performance of lock-free implementations by reducing contention, and we expect that they will be similarly effective in allowing obstruction-free operations to complete. Other "out of band" contention reduction mechanisms can also be employed, including mechanisms yet to be developed. The beauty of our approach is that the obstruction-free implementations themselves will not have to be modified (and therefore will not have to be reverified) in order to use a different contention reduction mechanisms.

Other possible approaches include queuing and time stamping approaches, in which threads agree amongst themselves to "wait" for each other to finish. While simplistic applications of these ideas would give rise to some of the same problems that the use of locks does, we have much more freedom in designing more sophisticated approaches for contention reduction than when using locks, because correctness is not jeopardized by interrupting an operation at any time and allowing another operation to continue execution. We expect that contention between operations will typically be quite rare, and that repeated retries will rarely be necessary. In scenarios where this is true, we benefit from the simple and efficient obstruction-free designs and only rarely invoke the more heavy-weight contention reduction mechanisms. In contrast, in most lock-free and wait-free implementations, the mechanisms that are used to ensure the respective progress properties impose significant overhead in the typical case.

Accordingly, building on these insights, we have developed a new dynamic form of software transactional memory. Our work differs from conventional software transactional memory (STM) implementations in several interesting ways. First, conventional STM implementations of which we are aware work only on statically allocated regions of shared memory, and are thus not suitable for implementing shared data structures whose size is dynamic (and for which it is impossible or undesirable to predict and preallocate sufficient space in advance). Second, our transactional memory interface is also dynamic in that it allows a transaction to determine the location of its next access based on a value read from previous locations. This capability is important for the convenient implementation of dynamic data structures, but is lacking in previous nonblocking transactional memory implementations. Third, our proposed interface departs from traditional transactional interfaces in that it provides support for sophisticated users to explicitly remove a data element from a transaction if correctness of the data structure implementation will not be jeopardized by that data element being modified without aborting this transaction. This allows users to exploit their knowledge of the semantics of the data structure being implemented and their ability to reason about concurrent accesses to the data structure in order to achieve more scalable implementations, while still being able to take advantage of transactional updates to simplify their designs. Finally, to our knowledge, previous STM implementations have been designed to be lock-free or wait-free and, as a result, exhibit all the complexity that achieving such non-blocking properties entails. In contrast, we require only that our implementation be obstruction-free. This condition is significantly weaker than lock-freedom and wait-freedom, but is still strong enough to preclude the use of locks. We believe that obstruction-free implementations are much simpler to design, and that they can be combined with a variety of different mechanisms in different circumstances to ensure that they perform comparably with, or better than, their lock-free and wait-free counterparts.

Of course, a given exploitation or implementation need not necessarily exhibit each of the aforementioned properties. Indeed, our invention(s) is (are) defined solely by the claims the follow.

Dynamic Software Transactional Memory

We implement Dynamic Software Transactional Memory (DSTM) as a low-level application programming interface (API) for synchronizing shared data without using locks. A transaction is a sequence of steps executed by a single thread. Transactions are atomic: each transaction either commits (it takes effect) or aborts (its effects are discarded). Transactions are linearizable: they appear to take effect in a one-at-a-time order. Transactional memory supports a computational model in which each thread announces the start of a transaction, executes a sequence of operations on shared objects, and then tries to commit the transaction. If the commit succeeds, the transaction's operations take effect; otherwise, they are discarded.

Much of the simplicity of our implementation is due to our choice of non-blocking progress condition. A synchronization mechanism is obstruction free if any thread that runs by itself for long enough makes progress (which implies that a thread makes progress if it runs for long enough without encountering a synchronization conflict from a concurrent thread). Like stronger non-blocking progress conditions such as lock-freedom and wait-freedom, obstruction-freedom ensures that a halted thread cannot prevent other threads from making progress.

Unlike lock-freedom, obstruction-freedom does not rule out livelock; interfering concurrent threads may repeatedly prevent one another from making progress. Livelock is, of course, unacceptable. Nonetheless, we believe that there is great benefit in treating the mechanisms that ensure progress as a matter of policy, evaluated by their empirical effectiveness for a given application and execution environment. Compared to lock-freedom, obstruction-freedom admits substantially simpler implementations that are more efficient in the absence of synchronization conflicts among concurrent threads.

Obstruction-freedom also allows simple schemes for prioritizing transactions because it allows any transaction to abort any other transaction at any time. In particular, a high-priority transaction may always abort a low-priority transaction. In a lock-based approach, the high-priority transaction would be blocked if the low-priority transaction held a lock that the high-priority transaction required, resulting in priority inversion and intricate schemes to circumvent this inversion. On the other hand, in a lock-free implementation, the high-priority transaction may have to help the low-priority transaction complete in order to ensure that some transaction will complete.

Our obstruction-free DSTM implementation provides a simple open-ended mechanism for guaranteeing progress and prioritizing transactions. Specifically, one transaction can detect that it is about to abort another before it does so. In this case, it consults a contention manager to determine whether it should abort the other transaction immediately or wait for some time to allow the other transaction a chance to complete. Contention managers in our implementation are modular: various contention management schemes can be implemented and "plugged in" without affecting the correctness of the transaction code. Thus we can design, implement and verify an obstruction-free data structure once, and then vary the contention managers to provide the desired progress guarantees and transaction prioritization. These contention managers can exploit information about time, operating systems services, scheduling, hardware environments, and other details about the system and execution environment, as well as programmer-supplied information. These practical sources of information have been largely neglected in the literature on lock-free synchronization. We believe that this approach will yield simpler and more efficient concurrent data structures, which will help accelerate their widespread acceptance and deployment.

A Simple Example

We now illustrate the use of DSTM through a series of simple examples. DSTM manages a collection of transactional objects, which are accessed by transactions. A transaction is a short-lived, single-threaded computation that either commits or aborts. In this simple example, a transactional object is a container for a regular Java™ object. Java programming constructs provide a convenient implementation environment and basis for description of our techniques, although implementations for other programming and execution environments will be appreciated by persons of ordinary skill in the art. Java and Java-based marks are trademarks or registered trademarks of Sun Microsystems, Inc. in the United States and other countries.

Turning to our simple example, a transaction can access a contained regular object by opening the transactional object, and then reading or modifying the regular object. Changes to objects opened by a transaction are not seen outside the transaction until the transaction commits. If the transaction commits, then these changes take effect; otherwise, they are discarded. Transactional objects can be created dynamically at any time. The creation and initialization of a transactional object is not performed as part of any transaction.

In our illustrative Java-based implementation, a basic unit of parallel computation is the TMThread class, which extends regular Java threads. Like a regular Java thread, it provides a run( ) method that does the work. In addition, the TMThread class provides additional methods for starting, committing or aborting transactions, and for checking on the status of a transaction. Threads can be created and destroyed dynamically.

Transactional objects are implemented by the TMObject class. To implement an atomic counter, one would create a new instance of a Counter class and then create a TMObject to hold it:

```
Counter counter = new Counter(O);
TMObject tmObject = new TMObject(counter);
```

Any class whose objects may be encapsulated within a transactional object must implement the TMCloneable interface. This interface requires the object to export a public clone( ) method that returns a new, logically disjoint copy of the object: DSTM uses this method when opening transactional objects, as described below. DSTM ensures that the object being cloned does not change during the cloning, so no synchronization is necessary in the clone( ) method.

A thread calls beginTransaction( ) to start a transaction. Once it is started, a transaction is active until it is either committed or aborted. While it is active, a transaction can access the encapsulated counter by calling open( ):

```
Counter counter =    (Counter)tmObject.open(WRITE);
counter.inc( );      // increment the counter
```

The argument to open( ) is a constant indicating that the caller may modify the object. The open( ) method returns a copy of the encapsulated regular Java object created using that object's clone( ) method; we call this copy the transaction's version.

The thread can manipulate its version of an object by calling its methods in the usual way. DSTM guarantees that no other thread can access this version, so there is no need for further synchronization. Note that a transaction's version is meaningful only during the lifetime of the transaction. References to versions should not be stored in other objects; only references to transactional objects are meaningful across transactions.

A thread attempts to commit its transaction by invoking commitTransaction( ), which returns true if and only if the commit is successful. A thread may also abort its transaction by invoking abortTransaction( ).

We guarantee that successfully committed transactions are linearizable, i.e., they appear to execute in a one-at-a-time order. But what kind of consistency guarantee should we make for a transaction that eventually aborts? One might argue that it does not matter, as the transaction's changes to transactional objects are discarded anyway. However, synchronization conflicts could cause a transaction to observe inconsistencies among the objects it opens before it aborts. For example, while a transaction T is executing, another transaction might modify objects that T has already accessed as well as objects that T will subsequently access. In this case, T will see only partial effects of that transaction. Because transactions should appear to execute in isolation, observing such inconsistencies may cause a transaction to have unexpected side-effects, such as dereferencing a null pointer, array bounds violations, and so on.

DSTM addresses this problem by validating a transaction whenever it opens a transactional object. Validation consists of checking for synchronization conflicts, that is, whether any object opened by the transaction has since been opened in a conflicting mode by another transaction. If a synchronization conflict has occurred, open( ) throws a Denied exception instead of returning a value, indicating to the transaction that it cannot successfully commit in the future. The set of transactional objects opened before the first such exception is guaranteed to be consistent: open( ) returns the actual states of the objects at some recent instant. Throwing an exception also allows the thread to avoid wasting effort by continuing the transaction.

An Extended Example

Consider a linked list whose values are stored in increasing order. We will use this list to implement an integer set (class IntSet) that provides insert( ), delete( ) and member( ) methods. Illustrative code fragments follow.

```
public class IntSet {
    private TMObject first;
    class List implements TMCloneable {
        int value;
        TMObject next;
        List(int v) {
            this.value = v;
        }
        public Object clone( ) {
            List newList = new List(this.value);
            newList.next = this.next;
            return newList;
        }
    }
    public IntSet( ) {
        List firstList = new List(Integer.MIN_VALUE);
        this.first = new TMObject(firstList);
        firstList.next =
            new TMObject(new List(Integer.MAX_VALUE));
    }
    public boolean insert(int v) {
        List newList = new List(v);
        TMObject newNode = new TMObject(newList);
        TMThread thread =
            (TMThread)Thread.currentThread( );
```

-continued

```
        while (true) {
            thread.beginTransaction( );
            boolean result = true;
            try {
                List prevList =
                    (List)this.first.open(WRITE);
                List currList =
                    (List)prevList.next.open(WRITE);
                while (currList.value < v) {
                    prevList = currList;
                    currList =
                        (List)currList.next.open(WRITE);
                }
                if (currList.value == v) {
                    result = false;
                } else {
                    result = true;
                    newList.next = prevList.next;
                    prevList.next = newNode;
                }
            } catch (Denied d) { }
            if (thread.commitTransaction( ))
                return result;
        }
    }
    ...
}
```

The IntSet class uses two types of objects: nodes and list elements; nodes are transactional objects (class TMObject) that contain list elements (class List), which are regular Java objects. The List class has the following fields: value is the integer value, and next is the TMObject containing the next list element. We emphasize that next is a TMObject, not a list element, because this field must be meaningful across transactions. Because list elements are encapsulated within transactional objects, the List class implements the TMCloneable interface, providing a public clone( ) method.

The IntSet constructor allocates two sentinel nodes, containing list elements holding the minimum and maximum integer values (which we assume are never inserted or deleted). For clarity, we focus on insert( ). This method takes an integer value; it returns true if the insertion takes place, and false if the value was already in the set. It first creates a new list element to hold the integer argument, and a new node to hold that list element. It then repeatedly retries the following transaction until it succeeds. The transaction traverses the list, maintaining a "current" node and a "previous" node. At the end of the traversal, the current node contains the smallest value in the list that is greater than or equal to the value being inserted. Depending on the value of the current node, the transaction either detects a duplicate or inserts the new node between the previous and current nodes, and then tries to commit. If the commit succeeds, the method returns; otherwise, it resumes the loop to retry the transaction.

An attractive feature of DSTM is that we can reason about this code almost as if it were sequential. The principal differences are the need to catch Denied exceptions and to retry transactions that fail to commit, and the need to distinguish between transactional nodes and non-transactional list elements. Note that after catching a Denied exception, we must still call commitTransaction( ) to terminate the transaction, even though it is guaranteed to fail.

Conflict Reduction Techniques—Read-Only Mode and Early Release

A transaction A will typically fail to commit if a concurrent transaction B opens an object already opened by A. Ultimately, it is the responsibility of the contention manager to ensure that conflicting transactions eventually do not overlap. Even so, the IntSet implementation just described introduces a number of unnecessary conflicts. For example, consider a transaction that calls member( ) to test whether a particular value is in the set, running concurrently with a transaction that calls insert( ) to insert a larger value. One transaction will cause the other to abort, since they will conflict on opening the first node of the list. Such a conflict is unnecessary, however, because the transaction inserting the value does not modify any of the nodes traversed by the other transaction. Designing the operations to avoid such conflicts reduces the need for contention management, and thereby generally improves performance and scalability.

DSTM provides several mechanisms for eliminating unneeded conflicts. One conventional mechanism is to allow transactions to open nodes in read-only mode, indicating that the transaction will not modify the object.

List list=(List)node.open(READ);

Concurrent transactions that open the same transactional object for reading do not conflict. Because it is often difficult, especially in the face of aliasing, for a transaction to keep track of the objects it has opened, and in what mode each was opened, we allow a transaction to open an object several times, and in different modes.

A revised insert( ) method walks down the list in read-only mode until it identifies which nodes to modify. It then "upgrades" its access from read-only to regular access by reopening that transactional object in WRITE mode. Read-only access is particularly useful for navigating through tree-like data structures where all transactions pass through a common root, but most do not modify the root.

Our DSTM techniques also provide a new and powerful way to reduce conflicts. Before it commits, a transaction may release an object that it has opened in READ mode by invoking the release( ) method. Once an object has been released, other transactions accessing that object do not conflict with the releasing transaction over the released object. The programmer should ensure that subsequent changes by other transactions to released objects will not violate the linearizability of the releasing transaction. The danger here is similar to the problem mentioned earlier to motivate validation; releasing objects from a transaction causes future validations of that transaction to ignore the released objects. Therefore, as before, a transaction can observe inconsistent state. The effects in this case are potentially even worse because that transaction can actually commit, even though it is not linearizable.

In our IntSet example, releasing nodes can be useful for navigating through the list with a minimum of conflicts, as illustrated by the following version of a delete( ) method with early release.

```
public boolean delete(int v) {
    TMThread thread =
        (TMThread)Thread.currentThread( );
    while (true) {
        thread.beginTransaction( );
        boolean result = true;
        try {
            TMObject lastNode = null;
            TMObject prevNode = this.first;
            List prevList = (List)prevNode.open(READ);
            List currList = (List)prevList.next.open(READ);
            while (currList.value < v) {
                if (lastNode != null)
                    lastNode.release( );
                lastNode = prevNode;
                prevNode = prevList.next;
                prevList = currList;
```

```
        currList = (List)currList.next.open(READ);
    }
    if (currList.value != v) {
        result = false;
    } else {
        result = true;
        prevList = (List)prevNode.open(WRITE);
        prevList.next.open(WRITE);
        prevList.next = currList.next;
    }
} catch (Denied d) { }
if (thread.commitTransaction( ))
    return result;
    }
}
```

As a transaction traverses the list, opening each node in READ mode, it releases every node before its prey node. A transaction that adds an element to the list "upgrades" its access to the node to be modified by reopening that node in WRITE mode. A transaction that removes an element from the list opens in WRITE mode both the node to be modified and the node to be removed. It is easy to check that these steps preserve linearizability.

Because a transaction may open the same object several times, the DSTM matches, for each object, invocations of release( ) with invocations of open(READ); an object is not actually released until release( ) has been invoked as many times as open(READ) for that object. Objects opened in WRITE mode by a transaction cannot be released before the transaction commits; if a transaction opens an object in READ mode and then "upgrades" to WRITE mode, subsequent requests to release the object are silently ignored.

Clearly, the release facility must be used with care; careless use may violate transaction linearizability. Nevertheless, we have found it useful for designing shared pointer-based data structures such as lists and trees, in which a transaction reads its way through a complex structure.

An Illustrative Implementation

We now describe an illustrative DSTM implementation. A transaction object (class Transaction) has a status field that is initialized to be ACTIVE, and is later set to either COMMITTED or ABORTED using a CAS instruction. Although native CAS support is available in many modern processor architectures, CAS functionality for Java-based software implementations may conveniently build on facilities provided by an AtomicReference class in the java.util.concurrent package that has been made available to the public in source form through the Java Community Process. See generally, Java Specification Request for Concurrent Utilities (JSR166), available on-line at http://jcp.org.

Opening a Transactional Object

Recall that a transactional object (class TMObject) is a container for a regular Java object, which we call a version. Logically, each transactional object has three fields:
 1. transaction points to the transaction that most recently opened the transactional object in WRITE mode;
 2. oldObject points to an old object version; and
 3. newObject points to a new object version.

The current (i.e., most recently committed) version of a transactional object is determined by the status of the transaction that most recently opened the object in WRITE mode. If that transaction is committed, then the new object is the current version and the old object is meaningless. If the transaction is aborted, then the old object is the current version and the new object is meaningless. If the transaction is active, then the old object is the current version, and the new object is the active transaction's tentative version. This version will become current if the transaction commits successfully; otherwise, it will be discarded. Observe that, if several transactional objects have most recently been opened in WRITE mode by the same active transaction, then changing the status field of that transaction from ACTIVE to COMMITTED atomically changes the current version of each respective object from its old version to its new version; this is the essence of how atomic transactions are achieved in our implementation.

An interesting part of our implementation is how a transaction can safely open a transactional object without changing its current version (which should occur only when the transaction successfully commits). To achieve this, we need to atomically access the three fields mentioned above. However, current architectures do not generally provide hardware support for such atomic updates. Therefore, we introduce a level of indirection, whereby each TMObject has a single reference field start that points to a Locator object.

FIG. 1 illustrates one implementation of a Locator object. The Locator object includes the three fields mentioned above: transaction 111 points to the transaction that created the Locator, and oldObject 113 and newObject 112 point to the old and new object versions 123 and 122, respectively. This indirection allows us to change the three fields atomically by calling CAS to swing the start pointer from one Locator object to another.

Figure 2:
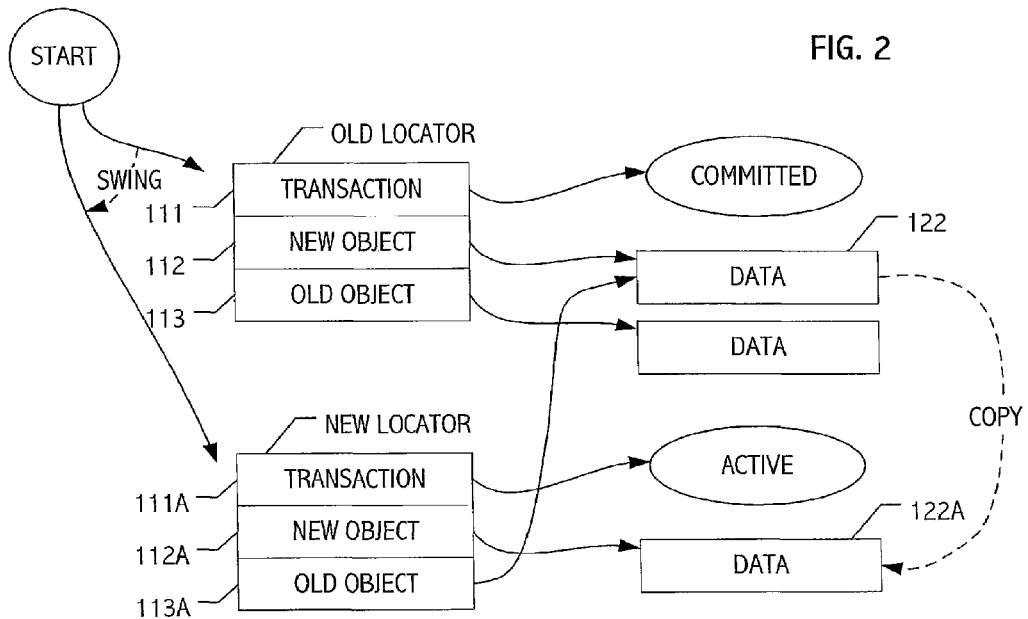
FIG. 2 depicts relationship between two locator structures in accordance with states typical, in some embodiments of the present invention, of opening a transactional object after a recent commit.
Figure 3:
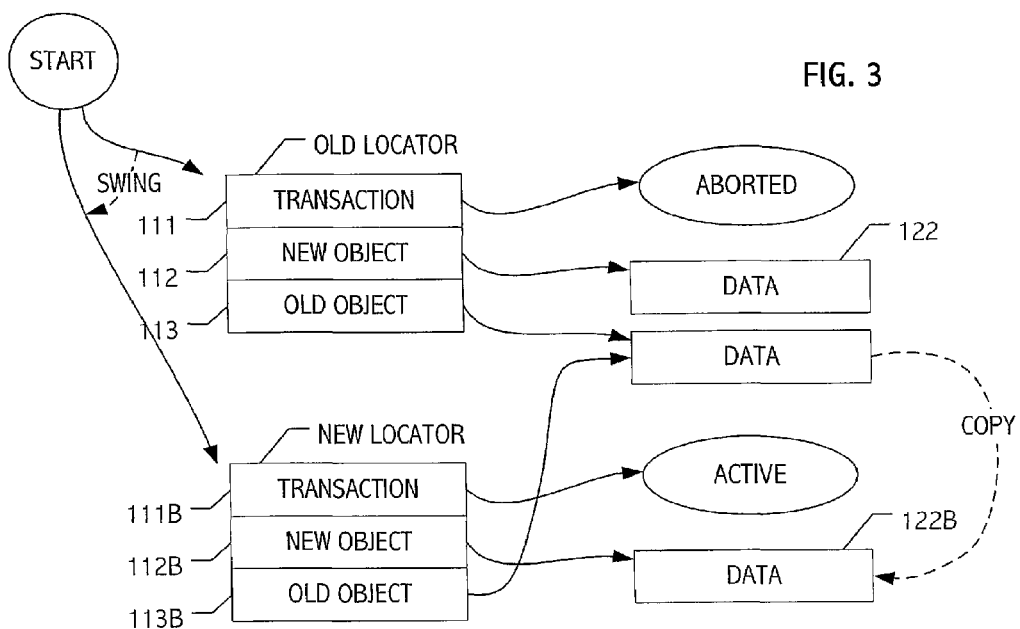
FIG. 3 depicts relationship between two locator structures in accordance with states typical, in some embodiments of the present invention, of opening a transactional object after a recent abort.

Referring to FIGS. 2 and 3, we now explain in more detail how transaction A opens a TMObject in WRITE mode. Let B be the transaction that most recently opened the object in WRITE mode. A prepares a new Locator object with transaction set to A. Suppose B is committed. A sets the new locator's oldObject field to the current newObject, and the new newObject field to a copy of the current newObject (see FIG. 2). (Recall that every class that can be encapsulated by a transactional object must export a public clone( ) method.) A then calls CAS to change the object's start field from B's old locator to A's new locator. If the CAS succeeds, the open( ) method returns the new version, which is now the transaction's tentative version of this object. A can update that version without further synchronization. If the CAS fails, the transaction rereads the object's start field and retries. Suppose, instead, that B is aborted. A follows the same procedure, except that it sets the new locator's oldObject field to the current oldObject (see FIG. 3).

Finally, suppose B is still active. Because B may commit or abort before A changes the object's start field, A cannot determine which version is current at the moment its CAS succeeds. Thus, A cannot safely choose a version to store in the oldObject field of its Locator. The beauty of obstruction-freedom is that A does not need to guarantee progress to B, and can therefore resolve this dilemma by attempting to abort B (by using CAS to change B's status field from ACTIVE to ABORTED) and ensuring that B's status field is either ABORTED or COMMITTED before proceeding (the change may have been effected by the action of some other transaction). This resolution also highlights an important property of our algorithm with respect to the integration of contention managers: Because A can determine in advance that it will interfere with B, it can decide, based on the policy implemented by its contention manager (discussed in the next section), whether to abort B or to give B a chance to finish.

Read-only access can also be provided. For example, in one illustrative implementation a thread-local read-only table may be employed. When A opens a transactional object o for reading, it identifies the last committed version v (possibly by aborting an active transaction) exactly as for write access.

However, instead of installing a new Locator object, A adds the pair (o, v) to a thread-local read-only table. To match invocations of open(READ) and release( ), the transaction also maintains a counter for each pair in its read-only table. If an object is opened in READ mode when it already has an entry in the table, the transaction increments the corresponding counter instead of inserting a new pair. This counter is decremented by the release( ) method, and the pair is removed when the counter is reduced to zero.

Implementations that facilitate read-only access are described in greater detail below. Of course, based on the description herein, persons of ordinary skill in the art will appreciate a variety of suitable alternatives. While the use of particular structures and techniques, including the use of a thread-local read-only table, provides a useful descriptive context, it will be understood that these structures and techniques are merely illustrative of a particular adaptation of our techniques.

Validating and Committing a Transaction

After open( ) has determined which version of an object to return, and before it actually returns that version, the DSTM must validate the calling transaction in order to ensure that the user transaction code can never observe an inconsistent state. Validation involves two steps:

1. For each pair (o, v) in the calling thread's read-only table, verify that v is still the most recently committed version of o.
2. Check that the status field of the Transaction object remains ACTIVE.

Committing a transaction involves two steps: validating the entries in the read-only table as described above, and calling CAS to attempt to change the status field of the Transaction object from ACTIVE to COMMITTED.

Costs

In the absence of synchronization conflicts, a transaction that opens W objects for writing requires W+1 CAS operations: one for each open( ) call, and one to commit the transaction. Synchronization conflicts may require more CAS operations to abort other transactions. These are the only strong synchronization operations needed by our DSTM implementation: once open( ) returns an object version, there is no need for further synchronization to access that version. A transaction also incurs the cost of cloning objects opened for writing; cloning is achieved using simple load and store instructions because the DSTM ensures objects being cloned do not change during the cloning.

Validating a transaction that has opened W objects for writing and R objects for reading (that have not been released) requires O(R) work. Because validation must be performed whenever an object is opened and when the transaction commits, the total overhead due to the DSTM implementation for a transaction that opens R for reading and W objects for writing is $O((R+W)R)$ plus the cost of copying each of the W objects opened for writing once. Note that, in addition to reducing the potential for conflict, releasing objects opened for reading also reduces the overhead due to validation: released objects do not need to be validated. Thus, if at most K objects are open for reading at any time, then the total overhead for a transaction is only $O((R+W)K)$ plus the cost of cloning the objects.

Representative API for Dynamic Transactional Memory

A variety of issues can affect definition of an application programming interface (API) for any particular implementation of dynamic transactional memory. Tradeoffs between functionality, convenience, and efficiency of implementation affect the choice of an API, so different API's may be desirable for different implementations. Accordingly, we do not specify the API. Instead, we present a sample API that provides a useful descriptive context for some of the main ideas behind dynamic transactional memory. Of course, the invention is defined solely by the claims that follow and exploitations in accordance with the claims need not precisely correspond with any aspect of any sample API or code realization. Indeed, based on the description herein (including that of any sample API), persons of ordinary skill in the art will appreciate a wide range of suitable adaptations for a given implementation. Accordingly, subject to the foregoing, we now present a representative API.

We illustrate the use of our representative API with several examples, including examples that closely parallel some of the preceding description, though in a procedural language (rather than object-oriented) context. We begin with a core set of operations, and then show how to implement a linked-list-based set with them. Then, we enrich the API with more operations, and demonstrate how these can be used to achieve more scalable implementations. We present the operations of a basic API first, and then add description of tm_read( ) and tm_release( ) operations.

blockid tm_alloc(int size)
    Purpose: Allocates a new logical block.
    Parameters: Size in bytes of block to be allocated.
    Return value: Logical block identifier.
    Remarks: Other transactional memory calls identify the new block by using the block id.

void tm_delete(blockid b)
    Purpose: Deallocate a logical block that is no longer required.
    Parameters: Block id of logical block to be deallocated.
    Return value: None.
    Remarks: In the examples used herein, we have not addressed the deallocation of logical blocks after use. This issue can in many cases be addressed by using Value Recycling techniques we have separately proposed, in which case we would use the tm_delete( ) operation to deallocate logical blocks.

void *tm_init(blockid b)
    Purpose: Used to initialize a newly-allocated block.
    Parameters: Block id of logical block to be initialized.
    Return value: Pointer to data block where initial value can be stored.
    Remarks: The returned pointer can be used only until the first call to tm_open for this block. Initialization is not part of a transaction; even if initialization is done within a transaction that later aborts, the initialization remains.

int tm_sizeof(blockid b)
    Purpose: Determine size of logical block.
    Parameters: Block id.
    Return value: Size in bytes of specified logical block.
    Remarks: A logical block's size is the size specified when it was allocated by tm_alloc( ).

trans_t *tm_start( )
    Purpose: Start a transaction.
    Parameters: None.
    Return value: None.
    Remarks: In the simple API presented here for the purposes of introducing the idea of dynamic transactional memory, we assume that transactions are not nested. For this simple case, no parameters are needed for tm_start ( ). It is straightforward to extend the API, and the implementation approaches described later, to support nested transactions.

void *tm_open(trans_t *t, blockid b)
    Purpose: Open a logical block for access within a transaction.

Parameters: Block id of logical block to be accessed.

Return value: Pointer to private copy of logical block's contents.

Remarks: Invoked within a transaction (i.e., after the invoking thread has called tm_start( ) and before it has subsequently called tm_abort( ) or tm_commit( )). Returns a pointer to a tentative data block which can be used for reading values from the block and for storing values that will take effect if and when the enclosing transaction successfully commits. Multiple calls to tm_open( ) for the same block in the same transaction will return the same pointer. Calls to tm_open( ) for different blocks in the same transaction may yield inconsistent values, but any transaction that observes such inconsistencies is guaranteed not to commit successfully. Thus, code that risks behaving incorrectly if it observes inconsistent data should call tm_validate( ) (described later) to ensure data is valid before executing the risky code. Pointers returned by tm_open( ) should be used only within the lifetime of the enclosing transaction and should not be stored in data blocks.

bool tm_commit(trans_t *t)

Purpose: Attempt to commit current transaction.

Parameters: None.

Return value: True if transaction commits successfully, false otherwise.

void tm_abort(trans_t *t)

Purpose: Explicitly abort current transaction.

Parameters: None.

Return value: None.

Remarks: An alternative is to treat tm_start( ) as an abort if it is invoked during a transaction. However, some implementations might perform better if transactions that are not intended to be completed are explicitly aborted.

bool tm_validate(trans_t *t)

Purpose: Determine whether current transaction can still commit successfully.

Parameters: None.

Return value: False if current transaction of invoking thread is destined to abort, true if it can still commit.

Remarks: Useful for determining whether data read so far in transaction was all consistent (if not, transaction will not commit successfully). Can also be used to avoid expensive computation if the transaction cannot commit.

void *tm_read(trans_t *t, blockid b)

Purpose: Open a logical block within a transaction for read only access.

Parameters: Block id of logical block to be read.

Return value: Pointer to private copy of logical block's contents.

Remarks: Data written to the private copy will not be stored to the logical block upon successful commit of the transaction.

void tm_release(trans_t *t, blockid b)

Purpose: Release a block previously opened with tm_read ( ) from the transaction.

Parameters: Block id of logical block to be released from transaction.

Return value: None.

Before we discuss the API in greater depth, some terminology and an overview is in order. First, we view dynamic transactional memory as a means for accessing a collection of logical blocks; references to such blocks are called logical block identifiers, or block ids for short. Some special value exists that will never be used as a block id; this can be used to indicate the absence of a block. As described later, a natural implementation approach is use pointers to some structure as block ids, so a null pointer serves this purpose. A new block of a specified size can be allocated using tm_alloc( ). The contents of a newly allocated block can be initialized by invoking tm_init( ) with its block id, and then storing the initial value of the logical block at the location specified by the pointer returned by this call. This is done before the block id of the new block is made available to any other thread or transaction, so there is no risk of partially-initialized data being observed. Once initialized, the value of a logical block can be changed only by a transaction that accesses that logical block and then commits successfully.

The basic anatomy of a transaction is as follows. A thread begins a transaction by invoking tm_start( ). During the transaction, the thread can access a number of logical blocks; to access one logical block, the thread invokes tm_open( ) with the block id for that block, and this call returns a pointer to a data block containing a value of the logical block. The thread can then read from this data block using ordinary loads and update it using ordinary stores. It is guaranteed that no other thread is using this data block, so the thread does not need to be concerned with concurrent accesses. Also, stores to this data block do not affect the value of the logical block with which it is associated until the transaction successfully commits; we call this data block the thread's tentative data block for that logical block. Note that pointers to tentative data blocks are for use by and within a single transaction only, and do not mean anything outside that transaction. In particular, these pointers should not be stored in data blocks to refer to other logical blocks; only logical block ids should be used for this purpose. The thread attempts to commit its transaction by invoking tm_commit( ), which returns true if the commit is successful, and false otherwise. If the commit is not successful, then the transaction does not affect the value of any logical block. Otherwise, the value of all logical blocks accessed by the transaction are atomically changed to the values of the associated tentative blocks. Furthermore, it is guaranteed that no block that is accessed by a successful transaction changes between the first time the transaction opens that block and the point at which the transaction commits. This is the power of the transactional approach: the programmer does not have to reason about data changing between the time they are read and the time at which updates based on the values read are made.

We ensure that the value a transaction sees for each logical block it accesses (i.e., the contents of its tentative block for that logical block immediately after it is returned from tm_open( ), and before the transaction updates the tentative block) was the value of the logical block at some point during the execution of tm_open. We do not guarantee that the values seen for two different logical blocks accessed by a transaction were the current values of those blocks at the same time. However, it follows from the guarantees made by tm_commit( ) that the values seen for all blocks accessed by a transaction that successfully commits are consistent with each other. Therefore, there is no risk that incorrect values that are stored in tentative blocks because of such inconsistencies will be committed. In some cases, however, there may be a risk that the transaction code might behave incorrectly if it sees inconsistent data. In other cases, the transaction may waste a significant amount of time trying to complete when it is already destined to fail. To allow programmers to avoid both situations, a tm_validate( ) operation is also provided, which returns true if the current transaction could still commit. For simplicity, we simplify our exposition by ignoring the issue of when a logical block can be deallocated. However, techniques, such as described in co-pending, commonly-owned U.S. patent application Ser. No. 10/340,156, filed Jan. 10, 2003, entitled "VALUE RECYCLING FACILITY FOR MULTITHREADED COMPUTATIONS" and naming Mark S. Moir, Victor Luchangco and Maurice Herlihy as inventors, may be employed to address this issue. In a realization that applied such techniques to deallocate logical blocks after use, we would also want a tm_delete( ) operation by which logical blocks could be destroyed.

With this overview in mind, we now present an example that demonstrates the use of the basic dynamic transactional memory operations to implement a set using a linked list. We present three examples. The first uses only the basic transactional memory API, as summarized above. The next two examples introduce optional extensions to this API, and demonstrate how their inclusion can support more scalable data structure implementations. In these simple examples, we omit the transaction argument from the calls to the transactional operations to avoid cluttering the examples; it should be clear from context how to modify these examples to conform to the actual API presented, above.

Basic Linked List Example

We now present an exemplary exploitation, a set of integers supporting insert and delete operations implemented using a singly linked list. Values are stored in the linked list in increasing order. Each linked list node is stored in a single logical block and contains a value and a block identifier for the next logical block in the list.

```
typedef struct list_s {
    blockid next;
    int value;
} list_t;
blockid CreateList( ) {
00 blockid f_block = tm_alloc(sizeof(list_t));
01 blockid l_block = tm_alloc(sizeof(list_t));
02 list_t *first = (list_t *) tm_init(f_block);
03 list_t *last = (list_t *) tm_init(l_block);
04 first->next = l_block;
05 first->value = -MAXINT;
06 last->next = (blockid) NULL;
07 last->value = MAXINT;
08 return f_block;
}
```

A CreateList( ) procedure allocates two logical blocks. (lines 0 and 1), acquires pointers to data blocks in order to initialize them (lines 2 and 3), and then initializes them (lines 4 through 7) so that the first points to the second, the first contains −MAXINT, and the second contains MAXINT. These two nodes act as sentinels to simplify the insertion and deletion cases so that no special cases are necessary. It is assumed that −MAXINT and MAXINT are never inserted or deleted. CreateList( ) returns the logical block id of the first block; this is the block id used to identify the list to subsequent insert( ) and delete( ) operations. Note that CreateList ( ) does not involve any transactions; as explained earlier, it is not necessary to initialize newly allocated blocks with transactions because they are initialized before any transaction accesses them.

The following code implements the insert( ) and delete( ) operations.

```
bool insert(blockid L; int v) {
09 blockid nodeid = tm_alloc(sizeof(list_t));
10 list_t *node = (list_t*) tm_init(nodeid);
```

-continued

```
11 node->value = v;
12 while (1) {
13    tm_start( );
14    list_t *prev = tm_open(L);
15    list_t *curr = tm_open(prev->next);
16    while (curr->value < v && tm_validate( )) {
17        prev = curr;
18        curr = tm_open(curr->next);
19    }
20    if (curr->value == v) {
21        if (tm_commit( ))
22            return false;
23    } else {
24        node->next = prev->next;
25        prev->next = nodeid;
26        if (tm_commit( ))
27            return true;
28    }
29 }
}
bool delete(blockid L; int v) {
30 while (1) {
31    tm_start( );
32    list_t *prev = tm_open(L);
33    list_t *curr = tm_open(prev->next);
34    while (curr->value < v && tm_validate( )) {
35        prev = curr;
36        curr = tm_open(curr->next);
37    }
38    if (curr->value != v) {
39        if (tm_commit( ))
40            return false;
41    } else {
42        prev->next = curr->next;
43        if (tm_commit( ))
44            return true;
45    }
46 }
}
```

Operation of the insert( ) and delete( ) operations is similar. Therefore, we focus on the insert( ) operation. The insert( ) operation accepts an integer value v to be inserted into the set, and returns true if it is successfully inserted and false if v is already in the set. It begins by allocating a new logical block for the new list node it will potentially insert into the list, and initializing the value field to the value being inserted (lines 9 through 11). Next, the insert( ) operation repeatedly attempts to use a transaction to either insert the new node into the appropriate position in the list, or confirm that v is already in the list (lines 12 through 29). When one such transaction commits successfully, the operation completes and returns an appropriate return value; when a transaction does not commit successfully, the operation retries the loop. We now describe the transaction, when executed by thread p, in more detail.

The basic technique is to "walk" down the linked list, always maintaining a reference to a "current" node and a reference to a "previous" node. The goal is to end up with the current reference referring to the node with value v if v is already in the list, or the node containing the smallest value in the list that is greater than v if not. In either case, the previous reference should refer to the node in the list immediately preceding the node referred to by the current reference. This allows us to determine whether v is already in the list, and if not, where the new node containing v should be inserted.

In more detail, p first indicates that it is starting a new transaction by invoking tm_start( ) (line 13). It then sets up its previous reference to refer to the sentinel node containing −MAXINT and its current reference to refer to that sentinel's successor in the list (lines 14 and 15). Then, the loop at lines 16 through 19 repeatedly advances each reference by one node down the list while the value in the current node is still smaller than v.

When the loop terminates, p determines whether v is already in the list (line 20). If so, p attempts to commit its transaction (line 21) to be sure that it saw a consistent state; if it succeeds, it returns false, otherwise it retries. If p does not see v already in the list, then it attempts to insert its new node containing v. It first updates the next field of its new node to contain the logical block id of the node containing the next larger value, and then updates the next field of the previous node to contain the logical block id of p's new block (lines 24 and 25). Finally, p attempts to commit these changes, and if it does so successfully, then it returns true to indicate that it successfully inserted v into the set; otherwise it retries.

It is easy to see that transactions that successfully commit in the set implementation just described correctly maintain the linked list representation of the implemented set. One more issue bears mention. While transactions that do not commit successfully do not modify any logical blocks, and therefore do not corrupt the linked list, we must still take care to consider the behavior of our transaction code when the transaction does not commit successfully. In particular, as stated earlier, data observed by a transaction that does not commit successfully is not guaranteed to be consistent across blocks. Thus, for example, it is possible that when walking down the list, we follow a link to a node that has already been removed from the list. While our example will not behave incorrectly in this case, we may be concerned that the loop at lines 16 through 19 in the insert( ) operation for example may not terminate. In fact, this is not true in this case, but this requires some reasoning that may be difficult in more complicated examples. We can avoid this reasoning by using tm_validate( ) to break out of the loop if the transaction will not commit successfully (see line 16, for example). There is a cost associated with this call to tm_validate( ), however, and we may wish to avoid it when possible. One can imagine a variety of schemes for avoiding or reducing this cost. One example would be to perform this check less often than every iteration.

Linked List Example with Read-Only Traversal

In the previous example, a transaction that is inserting a high value will cause a concurrent transaction that is inserting a lower value to fail, because the operations both open the set of logical blocks from the start of the list up to the position where the lower value should be inserted. However, this is not necessary in this case, because the transaction inserting the higher value does not modify any of the blocks it opens while traversing down the list. To allow programmers to avoid this problem, we can extend the basic API introduced so far to include a tm_read( ) operation to open blocks "read only." Implementations of dynamic STM should ensure that if multiple transactions concurrently open the same block for read only access, this does not cause any of them to fail to commit. Thus, tm_read( ) can be used to improve performance by allowing more successful transactions to execute concurrently.

The revised insert( ) and delete( ) operations that follow illustrate use of such a tm_read( ) operation.

```
bool insert(blockid L; int v) {
00   blockid nodeid = tm_alloc(sizeof(list_t));
01   list_t* node = (list_t*) tm_init(nodeid);
02   node->value = v;
03   while (1) {
04     tm_start( );
05     blockid prevblock = L;
06     list_t *prev = tm_read(L);
07     list_t *curr = tm_read(prev->next);
08     while (curr->value < v && tm_validate( )) {
09       prevblock = prev->next;
10       prev = curr;
11       curr = tm_read(curr->next);
12     }
13     if (curr->value == v) {
14       if (tm_commit( ))
15         return false;
16     } else {
17       node->next = prev->next;
18       prev = tm_open(prevblock);
19       prev->next = nodeid;
20       if (tm_commit( ))
21         return true;
22     }
23   }
}
bool delete(blockid L; int v) {
24   while (1) {
25     tm_start( );
26     blockid prevblock = L;
27     list_t *prev = tm_read(L);
28     list_t *curr = tm_read(prev->next);
29     while (curr->value < v && tm_validate( )) {
30       prevblock = prev->next;
31       prev = curr;
32       curr = tm_read(curr->next);
33     }
34     if (curr->value != v) {
35       if (tm_commit( ))
36         return false;
37     } else {
38       prev = tm_open(prevblock);
39       prev->next = curr->next;
40       if (tm_commit( ))
41         return true;
42     }
43   }
}
```

Providing the option to open a block for read only access significantly enhances scalability for some data structures. Imagine, for example, a tree-based data structure in which all operations traverse from the root down the tree towards the leaves, but most operations modify blocks only near the leaves. In this case, opening the blocks that are not modified for read only allows most of the transactions used for these operations to execute concurrently and to commit successfully, whereas without this option, all transactions open the root, and so two successful transactions cannot execute concurrently.

In exemplary code presented above, we use tm_read( ) instead of tm_open( ) to traverse the list (see lines 6, 7, 11, 27, 28, and 32). As a result, when we have identified the logical block that we wish to modify, we have opened it only for reading. Therefore, if the API is extended to include a tm_read( ) operation, we also would like a way to "upgrade" read-only access to a logical block in order to be able to write it. One possibility is to require tm_open( ) to upgrade from read-only to write in the case that it is called on a logical block that has previously been opened for read only. This is attractive because it does not require the programmers to distinguish between opening a block for the first time and upgrading the block from read-only to write access. This is the assumption we have made for our sample API. The example therefore uses tm_open( ) to upgrade access to the blocks that are to be modified (see lines 18 and 38). We keep track of the logical block id of the previous block in order to be able to upgrade access (see lines 5, 9, 26, and 30).

Linked List Example with Early Release

Even after the modifications described in the previous section, a transaction that commits successfully to insert a low value will cause a concurrent transaction that is attempting to insert a higher value to abort because it does actually modify a block that was read by that transaction. This is normal for the standard idea of transactions. However, it is not hard to see that, provided we are careful about boundary cases, it would be acceptable for the transaction inserting the higher value to succeed even though some block(s) it has read have since been modified. To allow transaction designers to take advantage of such situations, we can further extend the dynamic transactional memory API introduced so far to provide an "early release" option that allows a transaction to explicitly remove a block that it has previously read from the set of blocks whose modification by a concurrent transaction would cause the transaction to fail. The tm_release( ) operation serves this purpose.

In the revised insert( ) and delete( ) operations that follow, we show how the previous example can be modified to allow concurrent transactions to succeed more often using tm_release( ).

```
bool insert(blockid L; int v) {
00  blockid nodeid = tm__alloc(sizeof(list__t));
01  list__t *node = (list__t *) tm__init(nodeid);
02  node->value = v;
03  while (1) {
04    tm__start( );
05    blockid prevblock = L;
06    list__t *prev = tm__read(L);
07    list__t *curr = tm__read(prev->next);
08    while (curr->value < v) {
09      blockid blocktorelease = prevblock;
10      prevblock = prev->next;
11      tm__release(blocktorelease);
12      prev = curr;
13      curr = tm__open(curr->next);
14    }
15    if (curr->value == v) {
16      if (tm__commit( ))
17        return false;
18    } else {
19      node->next = prev->next;
20      prev = tm__open(prevblock);
21      prev->next = nodeid;
22      if (tm__commit( ))
23        return true;
24    }
25  }
}
bool delete(blockid L; int v) {
26  while (1) {
27    tm__start( );
28    blockid prevblock = L;
29    list__t *prev = tm__read(L);
30    list__t *curr = tm__read(prev->next);
31    while (curr->value < v) {
32      blockid blocktorelease = prevblock;
33      prevblock = prev->next;
34      tm__release(blocktorelease);
35      prev = curr;
36      curr = tm__open(curr->next);
37    }
38    if (curr->value != v) {
39      if (tm__commit( ))
40        return false;
41    } else {
42      blockid blocktoremove = prev->next;
43      prev = tm__open(prevblock);
44      curr = tm__open(blocktoremove);
45      prev->next = curr->next;
46      if (tm__commit( ))
47        return true;
48    }
49  }
}
```

Observe that we now invoke tm_release( ) (lines 11 and 34) in order to release blocks that are before our "previous" block in the list. In preparation for this, we must record the logical block id of that block before we overwrite the variable that contains it as we move down the list (see lines 9 and 32). Furthermore, we have also changed the delete( ) operation so that it invokes tm_open( ) on the block that it is removing, as well as its predecessor (lines 42 and 44).

To see why this is done, consider the following example. Suppose we have four list nodes with logical block ids A, B, C, and D, containing values 10, 20, 30, and 40, respectively. Consider a delete(20) operation and a delete(30) operation executing concurrently. Without the above mentioned modification, the following scenario would be possible. First, the delete(20) operation reaches a state in which it has invoked tm_open(A) (at line 43) in preparation for changing block A's next field to refer to block C. Note that, because we are assuming that we have not made the above-described modification, this operation has not invoked tm_open(B) (which it does at line 44 with the modification). Next, suppose the delete(30) operation reaches a similar state, in which it has invoked tm_open(B) at line 43 in preparation for changing block B's next field to refer to block D in order to effect the deletion of 30. Note that, at this point, the delete(30) operation has invoked tm_release(A) (its previous block is B and its current block is C). Therefore, the transaction of the delete (20) operation can commit successfully without preventing the transaction of the delete(30) operation from subsequently committing successfully too. If both transactions commit in that order, the 30 will not be correctly removed from the list, as block B is no longer the block in the list that points to it. Having the delete(20) operation also invoke tm_open(C) as described above causes the second transaction to fail, and therefore avoids this problem.

Note that, in order to understand this example in detail, and to gain confidence that the set implementation is correct, one should have some experience with reasoning about interactions between concurrent modifications to shared data structures, and about correctness conditions such as linearizability. Therefore, the early release option represents a significant departure from traditional transactional models, in which programmers do not have to concern themselves with reasoning about concurrency at all when considering safety properties (they must still deal with the consequences of transactions failing due to interference from concurrent transactions). Nonetheless, we believe that the inclusion of this functionality will provide an important "middle ground" between using traditional transactions (and not reasoning about concurrency at all), and having no transactional support whatsoever—which significantly complicates design and verification. Of course, designers who are not comfortable with this level of reasoning can simply avoid using tm_release( ) and continue to assume the traditional transactional behavior.

Implementation Approach

In this section, we give a high-level description of an approach we propose for implementing obstruction-free dynamic transactional memory. For now we describe an approach for implementing only the "basic" transactional memory API (that is, without operations supporting read-only access or early release).

We adopt an optimistic approach to implementing transactional memory: A transaction maintains a tentative data block for each logical block that it opens, and it applies its operations to that tentative data block. When the transaction commits, the values in the transaction's tentative data blocks atomically become the current values of the corresponding logical blocks.

The key to the simplicity of our approach lies in exploiting the weaker requirements of obstruction-freedom, as compared to lock-freedom and wait-freedom. In particular, because obstruction-freedom requires progress to be made only in the case that a single transaction runs in isolation, we do not need to maintain the possibility that multiple transactions accessing the same logical block can all commit successfully in the future. Thus, it is permissible for a transaction that encounters interference from another concurrent transaction to simply abort that transaction, which substantially simplifies the transaction state that needs to be maintained per logical block. In this section, we describe some of the main ideas behind this approach to implementing obstruction-free transactional memory.

Initial simplifying assumptions: To simplify our description, we assume for now that we have infinite memory (so there is no need to reclaim memory) and that we have synchronization primitives, such as a compare-and-swap (CAS) operation, which can atomically update arbitrary-sized memory locations. Later we discuss how to eliminate these assumptions by showing how to refine the algorithm to synchronize only on reasonably sized memory locations and how to reuse or reclaim the auxiliary data structures used by our transactional memory implementation. We also assume throughout most of this description that the logical blocks all have the same size. It is straightforward to extend the approach described here to support logical blocks of different sizes.

Data Structures

There are three primary types of data structures employed in our implementation: transaction descriptors, data blocks and data block locator records (locators). Because we do not have hardware support for atomically accessing multiple memory locations, the effect of atomically changing multiple logical blocks must be achieved by modifying a single per-transaction location in shared memory. For this purpose, each transaction has a transaction descriptor, containing a single field statusCode, which indicates whether the transaction is active, committed, or aborted:

```
typedef enum {
    ABORT_CODE, ACTIVE_CODE, COMMIT_CODE
} statusCode_t;
typedef struct trans_s {
    statusCode_t statusCode;
} trans_t;
```

The statusCode_t type shows defined constants representing the values abort, active, and commit, respectively.

Values for logical blocks are stored in data blocks, whose structure will, in general, be application-specific. For each logical block, we use a locator to track the current (most recently committed) data block as well as the tentative data block for the active transaction (if any) that has opened that logical block. Recall that an obstruction-free implementation does not need to maintain more than one tentative data block at a time for a logical block. Therefore the locator for each logical block contains two pointers to data blocks: oldData and newData. As explained in more detail below, the interpretation of these two fields depends on the status of the transaction that most recently opened this logical block. Thus, a locator also includes a pointer to the transaction descriptor for the transaction that most recently opened the associated logical block:

```
typedef struct locator_s {
    trans_t* trans; // pointer to transaction descriptor
    void* oldData; // (previously) committed data
    void* newData; // tentative or newly committed data
} locator_t;
```

For convenience, we say that a locator points to a transaction descriptor when the trans field of that locator points to that transaction descriptor. In the simple approach described in this section, a logical block id is simply a pointer to the associated locator.

The Approach

We now explain how a logical block's locator and the transaction descriptor to which it points are together interpreted to identify the current data block for that logical block; then we explain how the transactional memory operations are implemented using this interpretation. Given the locator l for a particular logical block:
  a. If l.trans→statusCode∈{active, abort} then l.oldData identifies the current data block for the logical block.
  b. If l.trans→statusCode=commit then l.oldData identifies the current data block for the logical block.

This interpretation lends itself to an efficient implementation of obstruction-free dynamic STM. To see why, first observe that changing td.statusCode from active to abort for some transaction descriptor td does not change the current data block for any logical block. Next observe that if td.statusCode changes from active to commit then for every logical block whose locator points to td, the current data block for that logical block changes from the data block pointed to by the oldData field of the locator to the data block pointed to by the newData field of the locator (and the current block does not change for any logical block whose locator does not point to td). By "the current data block changes" we mean that the identity of the current data block changes, not its contents. To avoid confusion, when we refer to the contents of the data block, we typically do so explicitly.

Therefore, an important strategy behind our approach is as follows. A new transaction is initialized as active. It can subsequently be aborted—by atomically changing its statusCode field from active to abort—without affecting the current value of any logical block. The transaction is committed by atomically changing its statusCode field from active to commit. Recall that for now we are assuming infinite memory, so let us assume that every call to tm_open( ) allocates a fresh tentative data block. Thus, the contents of a tentative data block are never modified (after the block has been initialized by tm_open( )) other than by the transaction to which it belongs, and the contents of a data block that has been committed are never changed again. Therefore, to achieve correct transactional semantics, it suffices to ensure the following three properties for each logical block opened by each transaction that commits successfully:
  1. the transaction's tentative data block for this logical block contains a copy of the current data block for this logical block at the moment that tm_open( ) returns a pointer to this tentative data block;
  2. the current data block for the logical block does not change between the moment that tm_open( ) returns and the moment that the transaction commits; and
  3. at the moment that the transaction commits, the newData field of the logical block's locator points to the transaction's tentative data block for this logical block and the trans field points to the transaction's descriptor.

To achieve the first and third properties above, tm_open( ) determines the current block for the logical block, copies its contents to a newly-allocated tentative data block, and then modifies the locator so that its newData field points to the new tentative block and its trans field points to the transaction's descriptor. Furthermore, to preserve the current data block until the subsequent commit, tm_open( ) should also store a pointer to this block in the oldData field of the locator. Provided tm_open( ) has correctly determined the current block, this does not disturb the current block, according to the interpretation of locators and transaction descriptors given above, because the transaction's statusCode can only be active or abort while it is executing tm_open( ).

Recall that determining the current data block for a particular logical block requires information from the logical block's locator as well as the transaction descriptor to which it points. However, we cannot read these two data structures atomically in order to determine the current data block, and even if we could, there would be a risk that the transaction descriptor would change before we updated the locator, potentially resulting in the block we previously determined to be current no longer being current. We deal with this problem as follows. First, we read the locator and subsequently modify it using CAS. If the CAS fails, then we retry, which is acceptable because this can happen only as the result of activity by a concurrent transaction, in which case obstruction-freedom does not require progress. If the CAS succeeds, then we can infer that the locator did not change between the time we read it and the time the CAS succeeded. Thus, by reading the transaction descriptor pointed to by the locator between reading the locator and performing the CAS on it, we can be sure that if the CAS succeeds then the data block we determine to be current based on the values read from the locator and the transaction descriptor to which it points was indeed the current data block at the time we read the transaction descriptor. If the statusCode of the transaction descriptor was abort or commit, then we can be sure that the data block we identified as current is still current when the CAS succeeds, as these values never change in a transaction descriptor. On the other hand, if the transaction to which the locator pointed was active, then there is a risk that this statusCode would change before the CAS succeeds, thereby changing the current data block for the logical block, resulting in the CAS installing an incorrect value (in the oldData field) for the current value.

To avoid this problem, if tm_open( ) encounters a locator that points to an active transaction, then that transaction must be aborted before tm_open( ) can safely attempt to modify the locator. This is achieved by using CAS to attempt to atomically change the statusCode field of that transaction's descriptor from ACTIVE_CODE to ABORT_CODE. Either the CAS succeeds, or some other CAS changes the descriptor to ABORT_CODE or to COMMIT_CODE; in either case, there is no risk that it will change again in the future, so we can reread the descriptor and rely on the value we obtain. (Later, we consider alternative policies such as pausing to give the transaction a chance to finish before attempting to abort it.) Attempting to abort the competing transaction also ensures that it will not mistakenly commit later, even after we have removed its tentative block pointer from the newData field of the locator (thereby violating property 3 above for that transaction).

Operations

Below we present pseudocode that demonstrates how each of the basic operations can be implemented. This pseudocode is somewhat simplified. For example, it assumes that every logical block has the same size BLOCK_SIZE, and it does not support transactions that open the same logical block multiple times, as real implementations should. Given the descriptions here of our approach, it is straightforward for one skilled in the art to extend this pseudocode to remove these simplifications.

To start a transaction, a thread allocates a new transaction descriptor and initializes it to ACTIVE_CODE:

```
trans_t *tm_start( ) {
    trans_t *trans = (trans_t *) malloc(sizeof(trans_t));
    trans->statusCode = ACTIVE_CODE;
    return trans;
}
```

To create a new logical block, a thread allocates memory for the block's locator, and initializes it with a dummy committed transaction, and allocates a data block for the newData field. (Recall that we are assuming a fixed block size for now.)

```
locator_t *tm_alloc( ) {
    locator_t *locator = (locator_t *)
                          malloc(sizeof(locator_t));
    // initialize locator's transaction field with committed
    // transaction
    locator->trans = (trans_t *)malloc(sizeof(trans_t));
    locator->trans->statusCode = COMMIT_CODE;  // dummy
                                                // committed
                                                // transaction
    locator->newData = malloc(BLOCK_SIZE); // initial value
    locator->oldData = NULL; // not needed
    return locator;
}
```

To provide a pointer through which a newly allocated logical block can be initialized, we simply return the newData pointer.

```
void *tm_init(locator_t *locator) {
    return locator->newData;
}
```

To open a logical block, we make use of an auxiliary function that returns a pointer to the current data block for that logical block. As explained earlier, if we encounter an active transaction at this block, we attempt to abort it and then reread its statusCode field. The read_committed( ) function can return an incorrect block, but only if the locator changes while read_committed( ) is executing; in this case the CAS in tm_open( ) (presented next) will fail, so no harm will be done.

```
void *read_committed(locator_t *locator) {
    trans_t *trans = locator->trans;
    // if transaction is active, try to abort it
    if (trans->statusCode == ACTIVE_CODE)
        CAS(&trans->statusCode, ACTIVE_CODE,
            ABORT_CODE);
    // transaction is now either committed or aborted
    if (trans->statusCode == COMMIT_CODE)
        return locator->newData; // transaction committed
    else
        return locator->oldData;  // transaction aborted
}
```

As explained earlier, a transaction opens a block as follows. It creates a new locator the replace the current one. The new locator is initialized so that the trans field is a pointer to the calling transaction and the newData field is a pointer to a newly-allocated tentative data block. The transaction enters a loop in which it reads the current locator. It copies that locator's data block into the new tentative block, and sets the new locator's oldData field to point to the committed data block. It then calls CAS to change the block's locator field from the old value to the new value. If it succeeds, it returns a pointer to the (tentative) data block. If it fails, it retries.

```
void *tm_open(trans_t *trans, locator_t *locator) {
    // initialize new locator value
    locator_t newLocator;
    newLocator.trans = trans;
    void *tentative = malloc(BLOCK_SIZE);
    newLocator.newData = tentative;
    // install new locator value
    while (TRUE) {
        // copy block's locator
        locator_t oldLocator = *locator;
        // get address of most recently committed data block
        void *committed = read_committed(locator);
        // copy data block to new locator's block
        memcpy(tentative, committed, BLOCK_SIZE);
        // point back to committed data block
        newLocator.oldData = committed;
        // try to install
        if (CAS(locator, oldLocator, newLocator))
            return tentative; // success!
    }
}
```

A transaction commits by calling CAS to attempt to change the statusCode field from ACTIVE_CODE to COMMIT_CODE:

```
bool tm_commit(trans_t *trans) {
    return CAS(&trans->statusCode, ACTIVE_CODE,
        COMMIT_CODE));
}
```

A transaction aborts by storing ABORT_CODE in its statusCode field (there is no need to use CAS because the transaction does not concurrently attempt to commit itself):

```
void tm_abort(trans_t *trans) {
    trans->statusCode = ABORT_CODE;
}
```

A transaction validates itself simply by checking if it is still active:

```
bool tm_validate(trans_t *trans) {
    return (trans->statusCode == ACTIVE_CODE);
}
```

Using Practical Synchronization Primitives

Thus far, we have assumed for ease of exposition that the CAS instruction operates on arbitrary-sized memory locations, and in particular, on a memory location large enough to hold a locator. However, the locator contains three pointers, and CAS operations on typical systems operate on locations that hold only one or two pointers. In this section, we describe how one can modify the previous section's implementation to use CAS operations that operate only on these smaller locations.

We add a level of indirection through a block header for accessing the locator of a logical block. The block header stores basic information about a block in the block_t data structure:

```
typedef struct block_s {
    locator_t *start;  // pointer to locator
} block_t;
```

Now, a logical block identifier (block id) is a pointer to the logical block's block header, rather than a pointer directly to a locator. The start field points to a locator. A transaction updates the locator of a logical block by allocating a new locator, initializing its fields with appropriate values, and then using CAS to change the start field atomically from the old locator to the new.

This simple indirection is sufficient if memory is never reclaimed and reused. Nevertheless, practical implementations will reuse memory occupied by defunct locators. We discuss some memory reclamation techniques, below. Memory reuse introduces the well-known "ABA problem," in which a thread wrongly concludes that a locator's value has not changed because a pointer to that locator appears not to have changed. The following example illustrates the problem.

1. Transaction t reads the address of locator l for logical block b, prepares a new locator l', and pauses.
2. Another transaction t' replaces l with another locator, and eventually reuses the memory occupied by l. Transaction t' initializes l to a new value, and installs a pointer to l in the b's block header.
3. Transaction t resumes execution, calls the CAS operation, and incorrectly replaces the address of l with the address of l'.

The source of the error is that l is attempting to replace one locator value with another, but is instead replacing one locator address with another.

One common and simple way to avoid the ABA problem is to tag each locator address with a version number. Specifically, we extend the start field with a counter that is incremented each time the field is modified. Each time a locator is reused, its address is tagged with a different version number, ruling out the erroneous behavior in the example. We assume here that the counter field is large enough that we can ignore the possibility that the counter will wrap around in the course of a single transaction. We say that such a counter is a safe counter.

These modifications are illustrated by the following code fragment:

```
/* assuming 32-bit pointers */
#define COUNTER_SHIFT 32       /* counter occupies
                                  high order bits */
#define POINTER_MASK 0xffffffff  /* pointer occupies
                                  low order bits */
#define GET_COUNTER(start) (start)   >> COUNTER_SHIFT
#define GET_POINTER(start) (start)   & POINTER_MASK
#define MAKE_START(ctr,ptr) ((ctr)   << COUNTER_SHIFT) | (ptr)
block_t *block = ... /* pointer to block header */
/* read double-word value to be replaced */
DWORD oldStart = block->start;
/* extract old counter value */
int counter = GET_COUNTER(oldStart);
```

-continued

```
/* extract old locator address */
locator_t *oldLocPtr = GET_POINTER(oldStart);
/* allocate new locator */
locator_t *newLocPtr = malloc(sizeof(locator_t));
/*initialize new locator */
...
/* increment counter & put in left word, pointer
   in right word */
DWORD newStart = MAKE_START(counter + 1, newLocPtr);
if (CAS(&block->start, oldStart, newStart) {
    /* update succeeded ... */
} else {
    /* update failed ... */
}
```

Because the counter and the pointer to the locator must be read and updated atomically, this solution needs a CAS that operates on double-word locations (or more precisely, a location large enough to hold a pointer and a safe counter). If the system provides only single-word CAS operations, we can circumvent this problem by allocating the locators within a contiguous region of memory beginning at a known memory address, and replacing the pointer in the start field with the locator's displacement within this region. This displacement is smaller than an address, and a single word should accommodate both a safe counter and the displacement. This solution requires us to preallocate space for the locators, but it is possible to grow this region dynamically if we exhaust it.

Memory Management

We now address the problem of reusing the memory structures employed by our algorithm. Although our algorithm is compatible with a variety of memory management techniques, we describe here several techniques that seem particularly well-suited. To simplify our presentation, we assume for the rest of the paper that each thread can have at most one active transaction at a time; it would be straightforward for one skilled in the art to remove this restriction given the descriptions here.

We address the issue of how to reuse memory structures such as locators, data blocks, and transaction descriptors. We do not discuss how they can be reclaimed (i.e., freed to the operating system). However, techniques, such as described in co-pending, commonly-owned U.S. patent application Ser. No. 10/340,156, filed Jan. 10, 2003, entitled "VALUE RECYCLING FACILITY FOR MULTITHREADED COMPUTATIONS" and naming Mark S. Moir, Victor Luchangco and Maurice Herlihy as inventors, may be employed if desired.

Locators

In a system of n threads and m logical blocks, we show how to reuse locators from a pool of n+m locators. If n and m are not known in advance, this pool can be designed to grow dynamically when it is exhausted. We assume the indirection described in the previous section: the locator field in the block_t structure is a pointer (or displacement) to a locator structure. The current locator for a logical block is the one indicated in the block_t structure for that logical block.

At any time, each locator has an owner, which can be either a thread or a logical block. Each logical block owns one locator, its current locator. Each thread also owns one locator, which it will use the next time it opens a logical block.

A thread t that owns a locator l opens a logical block b with current locator l' as follows: The thread t initializes l to the desired value (as described in previous sections), and uses a CAS operation to attempt to install l as the current locator for b. If the CAS operation succeeds, then t acquires ownership of l' from b and relinquishes ownership of l to b. If the CAS fails, then locator ownership remains unchanged.

Data Blocks

For ease of exposition, we assume for now that data blocks have uniform size, and that there is a fixed bound K on the number of logical blocks opened by any transaction. In a system with n threads and m logical blocks, we show how to reuse data blocks from a pool of at most n*K+m data blocks. Again, these parameters do not need to be known in advance: data blocks can be allocated as needed to populate the pools; we assume for now that K is known, and discuss later how to eliminate this assumption.

Data block reuse is also organized around a notion of ownership, but not in the same way as for locators. Like locators, a data block is owned either by a thread or by a logical block. A logical block owns one data block, its current data block. A thread owns K data blocks; at any point in time, each of these blocks is either being using as a tentative data blocks for a transaction, or is in a pool, available for such use. When a thread opens a logical block, it allocates its tentative block d from its pool. Unlike for locators, the ownership of a data block does not change at this point. Instead, data block ownership changes on transaction commit.

Suppose a transaction by thread t opens logical blocks $b_1, \ldots, b_k$, $k \leq K$, where $b_1, \ldots, b_k$ respectively own data blocks $d_1, \ldots, d_k$, and suppose that t uses $d'_1, \ldots, d'_k$ (owned by t) as tentative data blocks for $b_1, \ldots, b_k$ respectively. If t successfully commits the transaction, then t acquires ownership of $d_1, \ldots, d_k$ from logical blocks $b_1, \ldots, b_k$ respectively, and relinquishes ownership of $d'_1, \ldots, d'_k$ to $b_1, \ldots, b_k$ respectively. If the transaction for thread t aborts, then no data blocks change ownership. In either case, all data blocks owned by t are returned to its pool of available data blocks, to be reused in t's next transaction.

Recoverable Set

We now describe a simple recoverable set data structure that can be used to efficiently manage ownership of data blocks. This data structure maintains a set of data blocks so that we can tentatively remove some data blocks and tentatively add others. Later on, we can undo these operations, or make them permanent. Recoverable sets are not shared among concurrent threads, so there are no synchronization issues.

For simplicity, we assume for now an upper bound K on the number of blocks opened by a transaction. Consider the standard FIFO queue implementation employing a circular array of size 2K with a head index that indicates the next element to be removed from the array, and a tail index that indicates the next empty array slot. Augment this implementation with additional oldHead and oldTail index fields. Initially, all index fields are zero.

Tentative insert and remove operations modify the Head and Tail indexes and array locations as in the usual FIFO enqueue and dequeue operations. To make tentative changes permanent, we set oldHead equal to head and oldTail equal to tail. To discard tentative changes, we do the opposite. Each of these operations requires constant time.

Because the array has size 2K, tentative inserts never overwrite permanent values, and tentative removes never remove a tentative value. If K is not known in advance, it can be estimated, and it is straightforward to detect overflows and grow the array dynamically.

Multiple Block Sizes

So far, we have assumed all data blocks to have uniform size. In applications where data blocks may have different sizes, it is useful to assign each thread several recoverable sets, one for each anticipated block size. In a some embodiments, data block sizes would be rounded up to the nearest power of two. Each thread keeps a distinct recoverable set for each data block size within an anticipated range.

Transaction Descriptors

As described above, whenever a thread starts a new transaction, it allocates a transaction descriptor that holds the current status of that transaction. A thread commits its transaction by applying a CAS to change the status field of the transaction's descriptor from ACTIVE_CODE to COMMIT_CODE. To abort a transaction of another thread, a thread applies a CAS operation to attempt to change the status field of that transaction's descriptor from ACTIVE_CODE to ABORT_CODE.

We now describe one way to reuse transaction descriptors. Recall that each locator has a pointer to the transaction descriptor for the transaction that installed that locator (i.e., the transaction whose tm_open( ) operation stored a pointer to that locator in some block header using CAS). Any thread attempting to interpret that locator must examine the associated transaction descriptor to determine whether the transaction that installed the locator is committed, aborted or active. If the transaction descriptor is reused, then care must be taken to ensure that the thread examining a locator does not examine the transaction descriptor for the wrong transaction.

Suppose thread t completes a transaction with transaction descriptor T, installing locators $l_1, \ldots, l_k$. Before we can recycle T, we must "migrate" the status information for T (that is, whether it committed or aborted) from T to the locators $l_1, \ldots, l_k$. Recall that the status of a transaction is indicated by a simple code:

```
typedef enum {
    ABORT_CODE, ACTIVE_CODE, COMMIT_CODE
} statusCode_t;
```

We replace the trans field of each locator with a status field, which can have one of two kinds of values: a pointer to a transaction descriptor as before, or a statusCode_t indicating the outcome of the transaction. We refer to the latter as an immediate value.

```
/* An immediate commit/abort code or a pointer to
/* controlling transaction */
typedef union status_u {
    statusCode_t statusCode;   // immediate code
    trans_t *trans;            // indirect transaction pointer
} status_t;
typedef struct locator_s {
    status_t status;   // committed, aborted, or pointer to trans
    void *oldData;     // prior committed value
    void *newData;     // new or tentative value
} locator_t;
```

Each transaction descriptor T keeps track of the set of locators $l_1, \ldots, l_k$ installed on behalf of that transaction. Before a transaction can reuse T, it must first iterate through $l_1, \ldots, l_k$ and ensure that each status field has an immediate value in order to ensure that another transaction does not subsequently read an incorrect status for the transaction that previously used T. One way to accomplish this goal is to use CAS to replace any locator status field containing the address of T with a code indicating whether T committed or aborted. (It is important to use CAS to avoid overwriting a pointer to a different transaction descriptor in the case that the locator has already been reused.) In the following code fragment, we assume that the transaction descriptor includes an is et field containing the set of locators installed by the transaction. A locator is removed from the set by lset_get ( . . . ).

```
/* clean up locators before reusing the transaction descriptor
*/
void trans__cleanup(trans_t *self) {
    statusCode_t code = self->statusCode;
    locator_t *locPtr = lset__get(&self->lset);
    while (locPtr != NULL) {
        if (locPtr->status.trans == self) {
            CAS(&locPtr->status.statusCode, self, statusCode);
        }
        locPtr = lset__get(&self->lset);
    }
    self->statusCode = ACTIVE__CODE;
}
```

Numerous optimizations are possible. When a thread t acquires ownership of locator l installed by thread t', t can immediately set the status field of l to any immediate value because any tm_open( ) operation that uses this value to determine the current data block for some logical block will subsequently fail to replace this locator in the block header of the logical block it is opening. Because this is done only by the owner of the locator, it can be done with a simply store, rather than requiring a CAS. This relieves t' of the need to do a CAS to remove the transaction descriptor pointer. This approach is beneficial in systems where CAS is expensive.

One can extend this optimization further by having each thread rotate through a pool of transaction descriptors. This pool induces a delay between when a transaction commits and when its transaction descriptor is reused. This delay increases the chances that another thread will replace the status fields of locators (using a store as described above), thereby reducing the number of expensive CAS operations.

Read-Only Access

Under some circumstances, it is advantageous to permit concurrent transactions to read blocks in common without interfering with one another. To support this functionality, we add a new operation:

Void *tm_read(trans_t *t, blockid block);

Like tm_open( ), tm_read( ) returns a pointer to a copy of the block, and the caller can read from or write to this copy. The tm_read( ) operation differs from tm_open( ) in two important respects:

1. All changes made to the block through the pointer returned by tm_read( ) will be discarded when the transaction commits or aborts.
2. If transactions t and t' concurrently apply tm_read( ) to block b, then neither one necessarily causes the other to abort.

For brevity, we say transaction t reads block b if it applies tm_read( ) to b.

The consistency guarantee for tm_read( ) is the same as for tm_open( ): the pointer returned points to a data block containing some previously committed value of the block. Some implementations may additionally provide the programmer with a more efficient version of tm_read( ) that does not make this guarantee. As before, reading different blocks in the same transaction may yield inconsistent values, but any transaction that observes such inconsistencies is guaranteed not to commit successfully. Also as before, pointers returned by tm_read( ) should be used only within the transaction in which tm_read( ) was invoked.

We now illustrate some particular structures and techniques to implement read-only access. Of course, as before, based on the description herein, persons of ordinary skill in the art will appreciate a variety of suitable alternatives, and while the use of particular structures and techniques, including the use of a thread-local read-only table, provides a useful descriptive context, it will be understood that these structures and techniques are merely illustrative of a particular adaptation of our techniques. Therefore, in view of the foregoing and without limitation, we describe an illustrative implementation of read-only access.

Just as for tm_open( ), the transaction opens a block b by allocating a data block d, and acquiring a pointer to d', the data block holding the most recently committed version of b. Instead of installing a new version, however, the transaction records the read in the following structure:

```
//
// individual read-only record
//
typedef struct readonly_s {
    block_t *block;  // block read
    DWORD start;   // value read
} readonly_t;
```

This structure has two fields: block is the block id of the block opened, and start is the value of the block's start field at the time the block is opened. A transaction's readonly_t structures are kept in a readset_t data structure associated with the thread. A readset_t is a set of readonly_t structures; in the examples below, we assume that it is implemented as an array data of pointers to readonly_t, and a count top of elements in the array.

Before a transaction can commit, it must ensure that none of the blocks it has read has been modified, a process called validation. The transaction validates each block read by checking that each recorded start value matches that block's current start value. For example, the following procedure returns true if and only if every read-only block can be validated.

```
// validate all read-only blocks
bool readset_validateAll(readset_t *self) {
    int i;
    for (i = 0; i < top; i++) {
        if (self->data[i].block->start != self->data[i].start)
            return FALSE;
    }
    return TRUE;
}
```

Finally, support for read-only access requires modest changes to memory management. Recall that each time a transaction opens a block, it tentatively allocates a data block d of the appropriate size, and copies the block's current data block d' into d. If that transaction commits, it relinquishes ownership of d to the block, and acquires ownership of d' from the block. If that transaction aborts, block ownerships are unchanged. By contrast, each time t reads a block, each data block d returned by tm_read( ) is returned to the thread's pool, whether or not the transaction commits.

There are many ways to accomplish this functionality, but one of the simplest is to split the thread's pool of free data blocks into two recoverable sets, rset and wset. Blocks returned by tm_open( ) are tentatively allocated from wset, and blocks returned by tm_read( ) from rset. Exactly as before, if a transaction successfully commits, it makes the changes to wset permanent, and otherwise it undoes them. Either way, it undoes the operations applied to rset to prepare for reusing the same data blocks for subsequent read-only accesses.

To summarize, support for read-only access adds the following new fields to each thread.

```
//
// per-thread data structures
//
typedef struct mthread_s {
    ...
    readset_t readset;   // read-only blocks in the current
                         // transaction
    ...
    // memory management
    recover_t rset[TM_BLOCK_RANGE];   // read-only data blocks
                                       // sets, indexed by size
    recover_t wset[TM_BLOCK_RANGE];   // written data blocks
                                       // sets, indexed by size
    ...
} mthread_t;
```

Changing Access Modes

Consider a transaction t that uses tm_read( ) to navigate through a structure until it locates a block b, and then applies tm_open( ) to b with the intent to modify b. Care must be taken to ensure that the call to tm_open( ) does not cause t to abort when it tries to validate its earlier read of b.

There are several ways to accomplish this goal. One way is for tm_open( ) to check t's readset whenever it opens a block. This approach is unattractive, as it makes a common operation less efficient. A second way is to provide a distinct version of tm_open( ) that performs the same check, either though a distinct operation, or by adding a control argument to tm_open( ). It would be the programmer's responsibility to call the proper operation when opening a block.

A third approach is to exploit the safe counter in the start of the block header to detect when an apparent invalidation was caused by the same transaction. The safe counter acts as a version number: each successive locator has a counter value one greater than its predecessor. As before, to validate a read, a committing transaction t first compares the start field of its readonly_t record with the block's current start field. If they match, the read is validated. If they do not match, then suppose the field values are (c, l) and (c', l). If c'=c+1 and the transaction descriptor of l' matches that of t, then the read is validated. This approach has the advantage that the programmer does not have to keep track of which blocks may have been read, and the common cases require no extra work.

Early Release

A transaction t that has read block b will be aborted if another transaction t' opens block b before t commits. This danger can be reduced if t is allowed to release b, meaning that any subsequent accesses to b will not affect whether t commits or aborts.

A transaction t releases a block b in the following steps.

1. The transaction validates b, ensuring that no other transaction has opened it since t read b.
2. If the validation fails, then t is marked as aborted.
3. If the validation succeeds, then b is removed from t's readonly_t set, ensuring that b will not be validated when t commits.

Example code follows:

```
// validate this block and remove from readset
// REQUIRES block is in readset
BOOL readset_validate(readset_t *self, block_t *block) {
    int i;
    BOOL ok;
    for (i = 0; i < self->size; i++)
        if (self->data[i].block == block)
            break;
    if (self->data[i].block->start != self->data[i].start) {
        // remove this block from self
        ...
        return TRUE;
    } else {
        return FALSE;
    }
}
```

Contention Management

Despite our advocacy of obstruction-free synchronization, we do not expect progress to take care of itself. On the contrary, we have found that explicit measures are often necessary to avoid starvation. Obstruction-free synchronization encourages a clean distinction between the obstruction-free mechanisms that ensure correctness (such as conflict detection and recovery) and additional mechanisms that ensure progress (such as adaptive backoff or queuing).

In our transactional memory implementation, progress is the responsibility of the contention manager. Each thread has its own contention manager instance, which it consults to decide whether to force a conflicting thread to abort. In addition, contention managers of different threads may consult one another to compare priorities and other attributes.

A correctness requirement for contention managers is simple and quite weak. Informally, any active transaction that asks sufficiently many times must eventually get permission to abort a conflicting transaction. More precisely, every call to a contention manager method eventually returns (unless the invoking thread stops taking steps for some reason), and every transaction that repeatedly requests to abort another transaction is eventually granted permission to do so. This requirement is needed to preserve obstruction-freedom: A transaction T that is forever denied permission to abort a conflicting transaction will never commit even if it runs by itself. If the conflicting transaction is also continually requesting permission to abort T, and incorrectly being denied this permission, the situation is akin to deadlock. Conversely, if T is eventually allowed to abort any conflicting transaction, then T will eventually commit if it runs by itself for long enough.

The correctness requirement for contention managers does not guarantee progress in the presence of conflicts. Whether a particular contention manager should provide such a guarantee—and under what assumptions and system models it should do so—is a policy decision that may depend on applications, environments, and other factors. The problem of avoiding livelock is thus delegated to the contention manager.

Rather than mandate a specific contention-management policy, we define a ContentionManager interface that every contention manager must implement. This interface specifies two kinds of methods, notification methods and feedback methods, which are invoked by our DSTM implementation.

Notification methods inform a contention manager of relevant events in the DSTM; they do not return any value. For example, a commitTransactionSucceeded( ) method can be invoked whenever a transaction commits successfully, and a commitTransactionFailed( ) method can be invoked whenever an attempt to commit a transaction fails. Some notification methods correspond to events internal to our DSTM implementation. For example, a openReadAttempt( ) method is called to notify a contention manager before any attempt to open in READ mode an object that is not already open; similarly, a openWriteAttempt( ) method is called before any attempt to open an object in WRITE mode.

Feedback methods are called by the DSTM to determine what action should be taken in various circumstances. For example, a feedback method, shouldAbort( ) can be invoked when the DSTM detects a conflicting transaction during an attempt to open an object. A shouldAbort( ) method is passed the object being opened and the manager of the conflicting transaction, and it returns a boolean indicating whether to try to abort the conflicting transaction.

Other Embodiments

While the invention(s) is(are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. In addition, more complex shared object structures may be defined, which exploit the techniques described herein. While much of description herein has focused on compare and swap (CAS) based synchronization, other synchronization primitives may be employed. For example, based on the description herein, persons of ordinary skill in the art will appreciate that other suitable constructs, including load-linked and store-conditional operation pairs (LL/SC) may be employed, as well. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A non-transitory, computer readable storage medium, storing program code executable on one or more processors to implement:

creating an instance of a dynamically sizable data structure in shared storage, wherein the dynamically sizable data structure comprises one or more transactional objects, wherein the shared storage is managed through a software transactional memory interface, and wherein the dynamically sizable data structure is accessible to a plurality of concurrently executing instruction sequences, at least some of which comprise an atomic transaction; and performing concurrent non-blocking access operations on the dynamically sizable data structure instance through the software transactional memory interface, wherein said performing comprises:

one of the concurrently executing instruction sequences, during the course of an atomic transaction, opening a transactional object for access; and the one of the concurrently executing instruction sequences releasing the transactional object prior to termination of the atomic transaction.

2. The storage medium of claim 1, wherein the shared storage that is managed through the software transactional memory interface is itself dynamically sizable.

3. The storage medium of claim 1, wherein at least some atomic transactions that access a state of the dynamically sizable data structure determine a sequence of transactional objects to access based, at least in part, on a state of one or more transactional objects previously accessed during the same transaction.

4. The storage medium of claim 1, wherein the plurality of concurrently executing instruction sequences comprises a plurality of individual threads of a multithreaded computation that access the dynamically sizable data structure, and wherein the individual threads are dynamically creatable and dynamically destroyable throughout the course of the multithreaded computation.

5. The storage medium of claim 1, wherein access to the dynamically sizable data structure by the concurrent non-blocking access operations is mediated using a single-target synchronization primitive.

6. The storage medium of claim 1, wherein the dynamically sizable data structure comprises a collection of transactional objects that are dynamically instantiable in the shared storage.

7. The storage medium of claim 6, wherein the collection of transactional objects implements a list-oriented data structure or a tree-oriented data structure.

8. The storage medium of claim 1, wherein each of the transactional objects encapsulates a respective object of the dynamically sizable data structure or a respective component logical block of the dynamically sizable data structure.

9. The storage medium of claim 1, wherein the non-blocking access operations are obstruction free access operations that appear to execute in a one-at-a-time order, but do not themselves ensure progress of the plurality of concurrently executing instruction sequences in the presence of contention.

10. The storage medium of claim 1, wherein said performing further comprises:

one of the concurrently executing instruction sequences, during the course of an atomic transaction, opening a second transactional object for write access; and in response to non-blocking access operations on the second transactional object interfering with each other retrying the interfering access operations.

11. The storage medium of claim 1, wherein said opening comprises opening the transactional object for read-only access, wherein concurrently executed read access operations on the transactional object do not interfere with each other, and wherein said releasing is performed in response to determining that the transactional object was not opened for write access subsequent to said opening.

12. The storage medium of claim 9, wherein the program code is further executable on the one or more processors to implement a contention management mechanism, and wherein the contention management mechanism is configured to facilitate progress of the plurality of concurrently executing instruction sequences in the presence of contention between concurrent non-blocking access operations on the dynamically sizable data structure.

13. The storage medium of claim 1, wherein said performing further comprises:

one of the concurrently executing instruction sequences, during the course of an atomic transaction:

opening a second transactional object for read-only access;

subsequently determining that the second transactional object is to be modified by the atomic transaction; and in response to said determining, opening the second transactional object for write access.

14. The storage medium of claim 1, wherein said opening comprises validating the atomic transaction, and wherein said validating comprises determining whether any transactional object previously opened by the atomic transaction has since been opened in a conflicting mode by another transaction.

15. The storage medium of claim 1, wherein said opening comprises invoking an open-type operation of the software transactional memory interface, wherein said releasing comprises invoking a release-type operation of the software transactional memory interface, and wherein the software transactional memory interface further comprises a commit-type operation that, when invoked by one of the concurrently executing instruction sequences, attempts to commit an atomic transaction thereof.

16. The storage medium of claim 1, wherein the program code is further executable on the one or more processors to perform introducing one or more additional transactional objects into the dynamically sizable data structure while at least some of the plurality of instruction sequences are executing.

17. A non-transitory, computer readable storage medium, storing program code executable on one or more computers to implement a software transactional memory interface, wherein the software transactional memory interface comprises a plurality of operations for managing shared storage;

wherein the operations for managing the shared storage comprise:

an open-type operation that, when invoked by one of a plurality of concurrently executing atomic transactions that access a dynamically sizable data structure instantiated in the shared storage, opens a transactional object of the dynamically sizable data structure for access; and a commit-type operation that, when invoked by one of the concurrently executing atomic transactions, attempts to commit the atomic transaction.

18. The storage medium of claim 17, wherein the operations for managing the shared storage further comprise a release-type operation that, when invoked by one of the concurrently executing atomic transactions, releases a transactional object that was opened by the atomic transaction prior to termination of the atomic transaction.

19. An apparatus, comprising:
one or more processors; and
a memory;
wherein the memory comprises program instructions executable by the one or more processors to perform:
creating an instance of a dynamically sizable data structure in shared storage, wherein the dynamically sizable data structure comprises one or more transactional objects, wherein the shared storage is managed through a software transactional memory interface, and wherein the dynamically sizable data structure is accessible to a plurality of concurrently executing instruction sequences, at least some of which comprise an atomic transaction; and
performing concurrent non-blocking access operations on the dynamically sizable data structure instance through the software transactional memory interface;
wherein said performing comprises one of the concurrently executing instruction sequences, during the course of an atomic transaction, opening a transactional object for access;
wherein said opening comprises validating the atomic transaction, and wherein said validating comprises determining whether any transactional object previously opened by the atomic transaction has since been opened in a conflicting mode by another transaction.

20. The apparatus of claim 19, wherein said executing further comprises the one of the execution sequences releasing the transactional object prior to termination of the atomic transaction.

* * * * *

UNITED STATES PATENT AND TRADEMARK OFFICE
CERTIFICATE OF CORRECTION

PATENT NO. : 8,176,264 B2
APPLICATION NO. : 13/030992
DATED : May 8, 2012
INVENTOR(S) : Moir et al.

It is certified that error appears in the above-identified patent and that said Letters Patent is hereby corrected as shown below:

In column 1, line 22, delete "non blocking" and insert -- non-blocking --, therefor.

In column 3, line 34, delete "nonblocking" and insert -- non-blocking --, therefor.

In column 3, line 37, delete "nonblocking" and insert -- non-blocking --, therefor.

In column 3, line 40, delete "nonblocking" and insert -- non-blocking --, therefor.

In column 4, line 21, delete "Obstruction free" and insert -- Obstruction-free --, therefor.

In column 6, line 14, delete "obstruction free" and insert -- obstruction-free --, therefor.

In column 11, line 18, delete "prey" and insert -- prev --, therefor.

In column 16, line 50, delete "tm_open." and insert -- tm_open ( ).--, therefor.

In column 28, line 34, delete "initializes/to" and insert -- initializes 1 to --, therefor.

In column 29, line 62, delete "initializes/to" and insert -- initializes 1 to --, therefor.

In column 30, line 66, delete "In a some" and insert -- In some --, therefor.

In column 31, line 67, delete "is et" and insert -- lset --, therefor.

In column 37, line 52, in Claim 9, delete "obstruction free" and insert -- obstruction-free --, therefor.

Signed and Sealed this
Thirty-first Day of July, 2012

David J. Kappos
*Director of the United States Patent and Trademark Office*